US012644978B2

(12) United States Patent
Seibert

(10) Patent No.: US 12,644,978 B2
(45) Date of Patent: Jun. 2, 2026

(54) OBJECT DETECTION SYSTEMS AND METHODS

(71) Applicant: NextNav, LLC, Sunnyvale, CA (US)

(72) Inventor: Cristina Seibert, Mountain View, CA (US)

(73) Assignee: NextNav, LLC, Sunnyvale, CA (US)

( * ) Notice: Subject to any disclaimer, the term of this patent is extended or adjusted under 35 U.S.C. 154(b) by 267 days.

(21) Appl. No.: 18/611,305

(22) Filed: Mar. 20, 2024

(65) Prior Publication Data

US 2024/0319356 A1     Sep. 26, 2024

Related U.S. Application Data

(60) Provisional application No. 63/491,812, filed on Mar. 23, 2023.

(51) Int. Cl.
| | |
|---|---|
| *G01S 13/58* | (2006.01) |
| *G01S 13/42* | (2006.01) |
| *G01S 13/933* | (2020.01) |

(52) U.S. Cl.
CPC ............ *G01S 13/583* (2013.01); *G01S 13/42* (2013.01); *G01S 13/933* (2020.01)

(58) Field of Classification Search
CPC ...... G01S 13/003; G01S 13/42; G01S 13/583; G01S 13/878; G01S 13/933; G01S 7/006
See application file for complete search history.

(56) References Cited

U.S. PATENT DOCUMENTS

| | | | | | |
|---|---|---|---|---|---|
| 6,040,800 | A | * | 3/2000 | Raith | G01S 5/06 342/465 |
| 6,133,876 | A | * | 10/2000 | Fullerton | G01S 13/76 342/132 |
| 7,191,385 | B2 | * | 3/2007 | Olaker | H04W 64/00 714/780 |
| 7,212,563 | B2 | * | 5/2007 | Boyd | G01S 5/02216 340/450 |
| 7,298,327 | B2 | * | 11/2007 | Dupray | G01S 5/0278 342/451 |
| 8,018,371 | B1 | | 9/2011 | Paschen et al. | |
| 8,130,141 | B2 | * | 3/2012 | Pattabiraman | H04B 1/7087 342/357.29 |
| 9,057,606 | B2 | | 6/2015 | Wolf et al. | |

(Continued)

FOREIGN PATENT DOCUMENTS

EP            4249956 A1     9/2023

*Primary Examiner* — Peter M Bythrow
(74) *Attorney, Agent, or Firm* — MLO, a professional corp.

(57) ABSTRACT

The techniques described herein relate to a method of detecting an object in an environment using a system including a server and a set of transceivers. A first set of signals is transmitted and received by the set of transceivers, and processed to determine a background for an environment. A second set of signals is transmitted from the set of transceivers, all or a portion of the second set of transmitted signals are reflected off of an object of interest (OOI), and the reflected signals are received by the set of transceivers and processed to determine a first estimated location of the OOI by detecting a change between the first set of received signals and the first set of reflected signals. If the first estimated location is determined to be a reported location of the OOI then it is reported as a reported location to a system.

20 Claims, 13 Drawing Sheets

(56)  References Cited

U.S. PATENT DOCUMENTS

| | | | |
|---|---|---|---|
| 10,542,516 B2 | 1/2020 | Raghupathy et al. | |
| 11,303,334 B2 * | 4/2022 | Liu | H04B 7/082 |
| 11,885,898 B2 * | 1/2024 | Billet | G06N 3/08 |
| 2002/0181565 A1 * | 12/2002 | Boyd | G01S 5/02216 |
| | | | 375/152 |
| 2003/0069025 A1 * | 4/2003 | Hoctor | G01S 5/06 |
| | | | 342/28 |
| 2004/0075605 A1 * | 4/2004 | Bradford | G01S 13/878 |
| | | | 342/96 |
| 2007/0032250 A1 * | 2/2007 | Feher | H04N 7/20 |
| | | | 455/456.2 |
| 2008/0102756 A1 * | 5/2008 | Lehtinen | G01S 5/00 |
| | | | 455/67.11 |
| 2008/0204322 A1 * | 8/2008 | Oswald | G01S 5/04 |
| | | | 342/465 |
| 2013/0028306 A1 * | 1/2013 | Seibert | H04L 27/0012 |
| | | | 375/259 |
| 2014/0029385 A1 | 1/2014 | Schumann | |
| 2016/0128067 A1 * | 5/2016 | Seibert | G01S 19/29 |
| | | | 370/329 |
| 2016/0242157 A1 * | 8/2016 | Seibert | H04L 5/0048 |
| 2017/0074980 A1 | 3/2017 | Adib et al. | |
| 2017/0168134 A1 | 6/2017 | Jenwatanavet | |
| 2017/0234978 A1 * | 8/2017 | Shvodian | G01S 11/06 |
| | | | 455/522 |
| 2018/0074177 A1 | 3/2018 | Rudoy | |
| 2018/0146329 A1 * | 5/2018 | Seibert | H04L 5/0007 |
| 2019/0324108 A1 * | 10/2019 | Wittenberg | G01S 13/003 |
| 2020/0088870 A1 * | 3/2020 | Tsiklauri | G01S 13/878 |
| 2020/0119780 A1 * | 4/2020 | Klemmer | H01Q 3/24 |
| 2020/0132823 A1 * | 4/2020 | Yun | G01S 13/726 |
| 2021/0018656 A1 * | 1/2021 | Seibert | G01C 21/206 |
| 2021/0055373 A1 * | 2/2021 | Smith | G01S 7/003 |
| 2021/0165090 A1 | 6/2021 | Lee et al. | |
| 2023/0138050 A1 | 5/2023 | Han et al. | |
| 2023/0421993 A1 * | 12/2023 | Edge | H04W 4/029 |
| 2024/0219547 A1 * | 7/2024 | Pandharipande | G01S 13/931 |

* cited by examiner

103A

103B

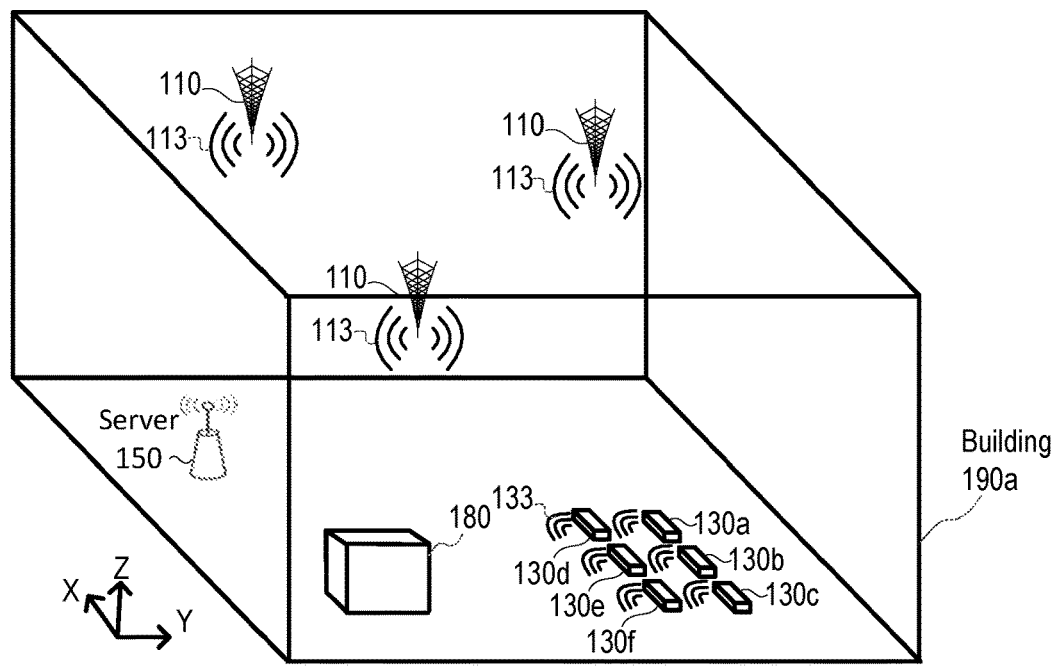
FIG. 5A
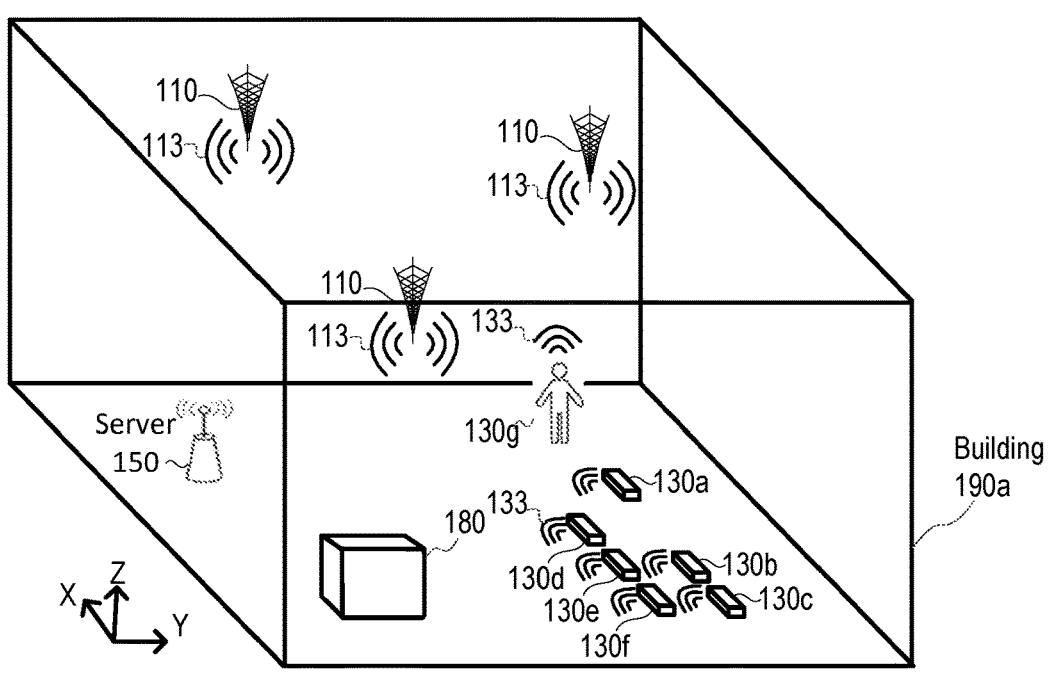
FIG. 5B

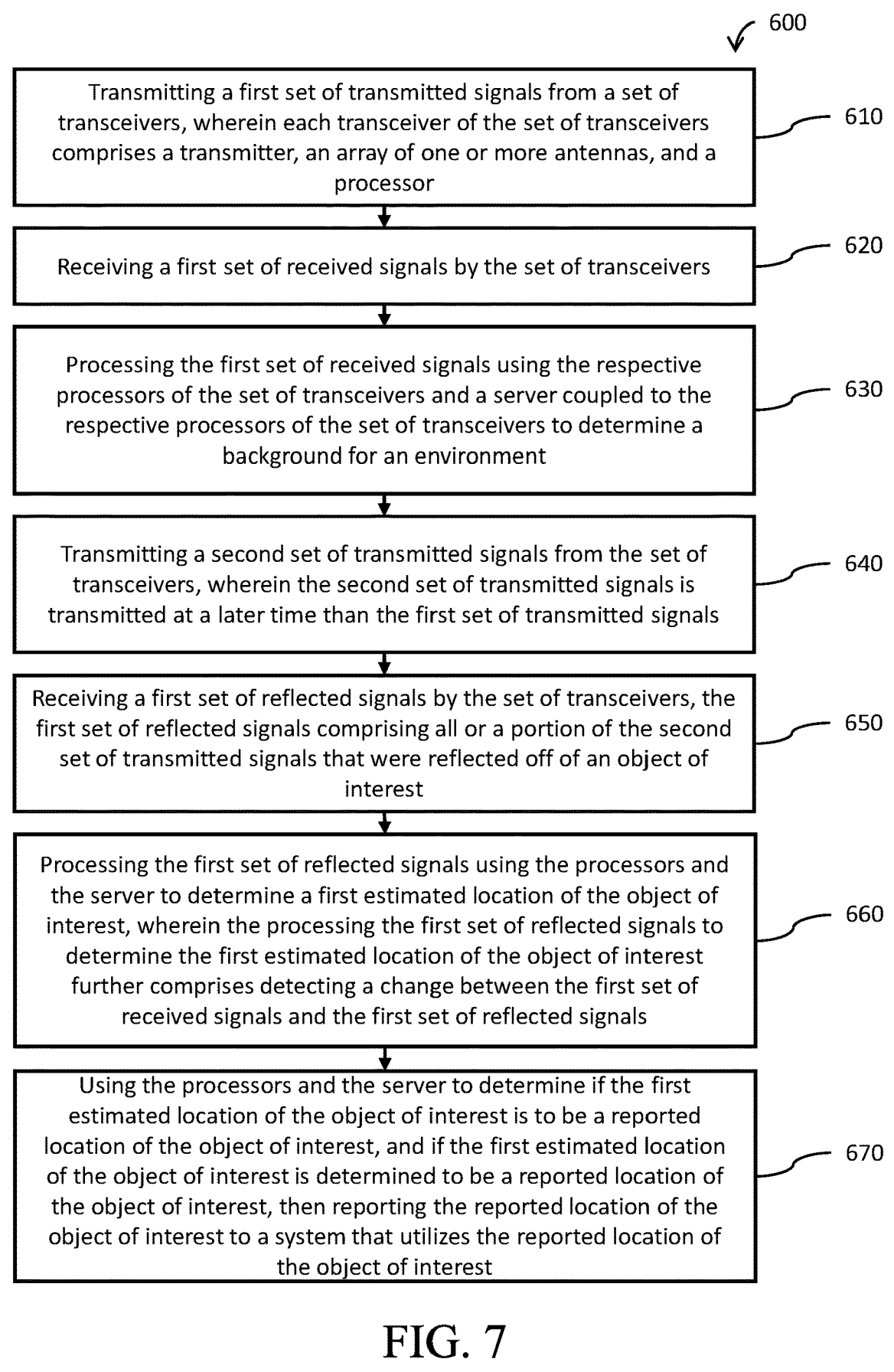

600

| Transmitting a first set of transmitted signals from a set of transceivers, wherein each transceiver of the set of transceivers comprises a transmitter, an array of one or more antennas, and a processor | 610 |

| Receiving a first set of received signals by the set of transceivers | 620 |

| Processing the first set of received signals using the respective processors of the set of transceivers and a server coupled to the respective processors of the set of transceivers to determine a background for an environment | 630 |

| Transmitting a second set of transmitted signals from the set of transceivers, wherein the second set of transmitted signals is transmitted at a later time than the first set of transmitted signals | 640 |

| Receiving a first set of reflected signals by the set of transceivers, the first set of reflected signals comprising all or a portion of the second set of transmitted signals that were reflected off of an object of interest | 650 |

| Processing the first set of reflected signals using the processors and the server to determine a first estimated location of the object of interest, wherein the processing the first set of reflected signals to determine the first estimated location of the object of interest further comprises detecting a change between the first set of received signals and the first set of reflected signals | 660 |

| Using the processors and the server to determine if the first estimated location of the object of interest is to be a reported location of the object of interest, and if the first estimated location of the object of interest is determined to be a reported location of the object of interest, then reporting the reported location of the object of interest to a system that utilizes the reported location of the object of interest | 670 |

FIG. 7

OBJECT DETECTION SYSTEMS AND METHODS

RELATED APPLICATIONS

This application claims the benefit of U.S. Provisional Patent Application No. 63/491,812 filed on Mar. 23, 2023, and entitled "Using the M-LMS Band for Intruder Detection"; which is hereby incorporated by reference for all purposes.

BACKGROUND

Systems to detect objects in an environment have many applications—for example, security systems or survey systems for tracking the locations and movements of objects (e.g., an air traffic control system, a system to monitor roadway traffic patterns, or a system to track the movement of people within a space).

Intruder detection systems are useful for the defense system of a country, as well as in commercial airspace operations where unmanned aircraft systems (UAS), rotorcraft, fixed-wing drones, and other types of aircraft and activities are becoming commonplace. Intruder detection is of particular importance in areas of conflict, as well as for airspace surveillance purposes on a global scale. To this end, the Radio Technical Committee for Aeronautics (RTCA) has standardized, in a guidance document DO-366A, a minimum operational performance standard for air-to-air radar for traffic surveillance, including intruder detection. The intended function of radar in this context is to detect and generate tracks for all airborne traffic within a radar detection volume.

To implement conventional object detection via airborne radar, wireless systems in higher frequency ranges are typically used (e.g., 5 GHz or higher). High-frequency signals are conventionally selected due to the processing requirements of the received signal as reflected by the object, where antenna arrays are generally used to compute the angles of signal arrival. The spacing between receive antennas is typically designed to be on the order of 1 wavelength of the received wireless signal. When a large number of antennae are used, the form factor of the receive antenna unit can become quite large, e.g., on the order of 10 wavelengths. For example, in a system based on a wireless signal with a frequency of 1 GHz, the signal wavelength is approximately 30 cm. As such, the form factor of the receive antennae array may need to be on the order of a few meters long. At 5 GHz, the wavelength is approximately 6 cm, and thus a similar antennae system could span less than 1 meter. In some implementations, for example in ground-based radar, the form factor of the receiver can be large, and thus the size of the receive antenna array can scale accordingly.

SUMMARY

In some embodiments, the techniques described herein relate to a method of detecting an object in an environment, including: transmitting a first set of transmitted signals from a set of transceivers, wherein each transceiver of the set of transceivers includes a transmitter, an array of one or more antennas, and a processor; receiving a first set of received signals by the set of transceivers; processing the first set of received signals using the respective processors of the set of transceivers and a server coupled to the respective processors of the set of transceivers to determine a background for an environment; transmitting a second set of transmitted signals from the set of transceivers, wherein the second set of transmitted signals is transmitted at a later time than the first set of transmitted signals; receiving a first set of reflected signals by the set of transceivers, the first set of reflected signals including all or a portion of the second set of transmitted signals that were reflected off of an object of interest; processing the first set of reflected signals using the processors and the server to determine a first estimated location of the object of interest, wherein the processing the first set of reflected signals to determine the first estimated location of the object of interest further includes detecting a change between the first set of received signals and the first set of reflected signals; and using the processors and the server to determine if the first estimated location of the object of interest is to be a reported location of the object of interest, and if the first estimated location of the object of interest is determined to be a reported location of the object of interest, then reporting the reported location of the object of interest to a system that utilizes the reported location of the object of interest.

In some embodiments, the techniques described herein relate to a method of detecting an object in an environment, including: transmitting a first set of transmitted signals from a first set of transceivers, wherein each transceiver of the first set of transceivers includes a transmitter, an array of one or more antennas, and a processor; receiving a first set of received signals by the first set of transceivers; processing the first set of received signals using the respective processors of the first set of transceivers and a server coupled to the respective processors of the first set of transceivers to determine a background for an environment; transmitting a second set of transmitted signals from the first set of transceivers, wherein the second set of transmitted signals is transmitted at a later time than the first set of transmitted signals; receiving a first set of reflected signals by the first set of transceivers, the first set of reflected signals including all or a portion of the second set of transmitted signals that were reflected off of an object of interest; processing the first set of reflected signals using the processors and the server to determine a first estimated location of the object of interest, wherein the processing the first set of reflected signals to determine the first estimated location of the object of interest further includes detecting a change between the first set of received signals and the first set of reflected signals; transmitting a third set of transmitted signals from a second set of transceivers, wherein the third set of transmitted signals is transmitted at a later time than the second set of transmitted signals, wherein each transceiver of the second set of transceivers includes a transmitter, an array of one or more antennas, and a processor, and wherein the second set of transceivers includes at least one transceiver that is not part of the first set of transceivers; receiving a second set of reflected signals by the second set of transceivers, the second set of reflected signals including all or a portion of the third set of transmitted signals that were reflected off of the object of interest; processing the second set of reflected signals using the respective processors of the second set of transceivers and the server to determine a second estimated location of the object of interest; determining a difference between the first estimated location of the object of interest and the second estimated location of the object of interest; and using the difference to determine that the first estimated location of the object of interest is a reported location of the object of interest, if the difference between the first estimated location of the object of interest and the second estimated location of the object of interest is less than a first threshold, and reporting the reported location of the object of interest to a system that utilizes the reported location of the object of interest; or using the difference to determine that the first estimated location of the object of interest is not a reported location of the object of interest, if the difference between the first estimated location of the object of interest and the second estimated location of the object of interest is greater than the first threshold.

BRIEF DESCRIPTION OF THE DRAWINGS

FIGS. 5A and 5B show examples of a system for detecting one or more objects in an environment at a first and second moment in time, respectively, wherein the environment is an indoor environment, and wherein the OOI can be tracked within the indoor environment, and wherein the OOI can be a person in some cases, in accordance with some embodiments.

FIGS. 7 and 8 are flowcharts of example methods for detecting an OOI in an environment using the systems described herein, for example, the transceivers of FIGS. 1A-5B, in accordance with some embodiments.

DETAILED DESCRIPTION

Figure 1A:
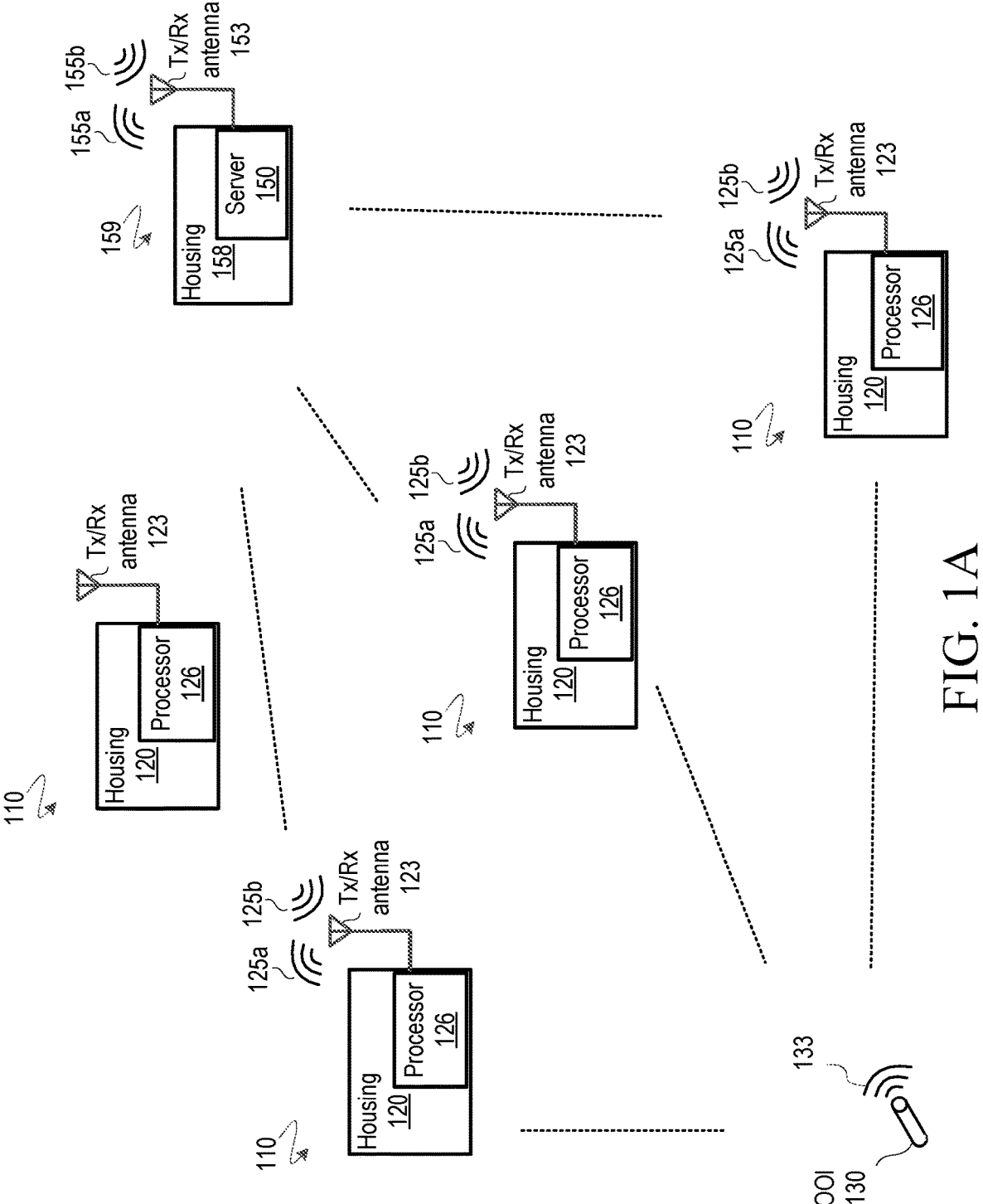
FIG. 1A shows a schematic example of a system for detecting one or more objects, including transceivers and a server system, in accordance with some embodiments.

Systems and methods for object detection are described herein. Transceivers are used to send and receive signals to determine a background for an environment, and detect the presence or absence of an object of interest (OOI). A set of transceivers can be used to determine locations of objects in the background and the OOI, for example, using multilateration or multiangulation techniques. Each transceiver of the set of transceivers can include a transmitter that sends signals. The transmitted signals reflect off of objects in the background and/or the OOI. Each transceiver further includes an antenna (or antenna array) that receives the reflected signals, and a processor that processes received signals to determine the background for an environment, and detect the presence or absence of the OOI. The processors of each transceiver can be in communication with a server (e.g., wired or wirelessly), and the processors and the server together can process information from the set of transceivers to determine the locations of the objects in the background and the OOI.

The systems and methods described herein can generally enable the detection of signatures and changes in the environment, which can be useful in many applications. For example, the systems and methods described herein can be used for security systems and/or surveillance systems. For example, a security system can be configured to detect intruders (e.g., aerial vehicles, vehicles on the ground, people in a space), or to detect theft (e.g., if an object is removed without authorization), or to detect objects, such as unauthorized aerial vehicles, within a defined space (or region). In other cases, the systems and methods described herein can be used as a surveillance system configured to track the locations and movements of objects, for example as air traffic control systems and methods, systems and methods to monitor roadway traffic patterns, or systems and methods to track the movement of people within a space. Some example applications of the systems and methods described herein include surveillance systems for shipping containers in shipyards, cars in car lots or on streets, airplanes in airports, boxes in warehouses, and articles being manufactured.

In some embodiments of the systems and methods described herein, wireless signals, propagated in the multilateration location monitoring systems band (M-LMS), are used as the transmitted signals. In some cases, the signals used by the systems and methods described herein use coded modulation, spread spectrum modulation, and/or pseudonoise (PN) modulation, to achieve wide bandwidths. In some cases, the processors of the transceivers of the systems described herein include appropriate filters (e.g., matched filters) to process the wide bandwidth signals. Positioning systems using coded modulation, spread spectrum modulation, and/or pseudonoise (PN) modulation that can be modified for use with the current systems and methods are described in more detail with reference to U.S. Pat. Nos. 8,130,141, 9,057,606, and 10,542,516, which are incorporated by reference herein in their entirety for all purposes. In some embodiments, signals transmitted from the transceivers are also used to communicate with the server (and/or the processors of other transceivers in the set of transceivers). In some embodiments, the same signals that are reflected off of an object in the environment (the background and/or the OOI) are also used as communication signals (i.e., signals that transmit information or data) between the transceiver and the server (and/or between different transceivers). For example, the frequency band of the signals sent and received by the transceivers that are used to estimate the location of objects can be in a frequency band that is typically used by communication systems, for example, voice carrier signals. In another example, the frequency band of the signals used to estimate the location of objects can be used as a communication band to communicate information (or data) from the transceivers to the server, for example, information (or data) can be communicated from the transceivers to the server using signals with frequencies in the M-LMS band. In some cases, the signals sent and received by the transceivers to estimate the locations of objects can be in the M-LMS band, and the communication signals sent from the transceivers to the server can be at a different frequency.

The M-LMS band has been allocated in the United States, as part of the 900 MHz frequency band, to support positioning applications and services based on multilateration location monitoring systems. For example, a positioning system using the M-LMS band can include transceivers (or beacons) operating in the 919.75 MHz to 927.25 MHz frequency range. A positioning system using the M-LMS band that can be modified for use with the current systems and methods is described in more detail below with reference to U.S. Pat. Nos. 8,130,141, and 9,057,606. The transceivers (or beacons) of such positioning systems may be synchronized with one another and may form a code division multiple access (CDMA) and/or time division multiple access (TDMA) network. Each of the transceivers (or beacons) may be operable to transmit a pseudo random number (PRN) sequence with good cross-correlation properties such as a Gold code sequence with a data stream of embedded assistance data. A Gold code sequence, also known as Gold sequence, is a type of binary sequence, used in telecommunication (CDMA) and satellite navigation (GPS), generally with small cross-correlations within a set, which is useful when multiple devices are broadcasting in the same frequency range. For example, a set of Gold code sequences can include $2^n+1$ sequences each one with a period of $2^n-1$. Alternatively, wireless signals transmitted by the transceivers (or beacons) may be staggered in time into separate slots in a TDMA format.

The M-LMS band may be advantageously used for the transmission and reception of wireless signals to detect changes in a local environment, e.g., for security systems and/or surveillance systems, in addition to the traditional positioning function. Air-traffic surveillance is intrinsically related to the broader function of position location, as it necessitates location identification—for example when computing the location of an object (e.g., an intruder) upon detection. As such, the security systems and/or surveillance systems described herein can use the M-LMS band, implemented using a system with transceivers configured to perform multilateration location monitoring. In the context of aerial intruder detection, for example, wireless signals transmitted from the transceivers of the positioning system are reflected by objects (in the background and/or the OOI). Transceivers receiving reflected signals may determine an estimated distance to such objects of interest, for example from the difference between the estimated time of arrival of the reflected signal and its transmission by the transceiver, divided by two, and multiplied by the speed of light to convert to units of distance.

In general, the signals sent and received by the transceivers of the systems and methods described herein to estimate the locations of objects can be from 100 MHZ to 100 GHz, or above 100 GHz. In some cases, signals sent and received by the transceivers of the systems and methods described herein can be from about 400 MHz to over 70 GHz, from 410 MHz to 7125 MHz, or from 24.25 GHz to 71.0 GHz.

In some embodiments, the transceivers can be coupled to airborne vehicles (e.g., unmanned aerial vehicles (UAVs) or drones). In such implementations, simplified antenna solutions may be leveraged at the receivers by using one, or a few, antenna receivers and thereby achieving a low form factor. If a large number of antenna receivers need to be supported for a particular use case, such as for estimation of an angle of arrival of reflected signals, and the receiver unit has form-factor constraints, innovative techniques for antenna design may be exploited. For example, in some embodiments, a design may allow for a distributed placement of the antennae along the surface of the device unit to maximize the interspacing of receive antennae in the array.

In traditional radar, frequency bands are used that allow for high transmit power, e.g., in the tens of kilowatts or higher. Such power levels can allow the radar function to be supported at propagation distances of tens of kilometers and higher. While propagation loss at lower frequencies such as the M-LMS band can be lower, the transmit power allowance in the M-LMS band is also significantly lower, for example 30 watts, which generally results in shorter distances that can be supported by the implementation of this system. For example, the systems and methods described herein using the M-LMS band may cover a detection space (or region) with a radius of less than about 10 km, or less than about 5 km, or less than about 1 km. In some cases, the systems and methods described herein using the M-LMS band may cover a detection space (or region) that is approximately hemispherical in shape with a radius of less than about 10 km, or less than about 5 km, or less than about 1 km. As a result, the systems and methods described herein using the M-LMS band may cover a detection space (or region) sufficient for use cases in local environments, for example for intruders or motion detection at close range.

In some embodiments, transceivers of the systems and methods described herein may be deployed in a traditional configuration on terrestrial towers, utility poles, and so on. Antenna arrays deployed at such transceivers can be advantageously used to process reflections of the transmitted signals to detect objects in the background or an OOI (e.g., intruders in the airspace under surveillance).

In another implementation, transceivers similar to those used by the terrestrial positioning system network described herein may be deployed on UAVs or drones for surveillance purposes.

As described above, some aspects of using reflected ranging signals from objects in an environment are similar to using a terrestrial positioning system to estimate the positions of mobile devices, for example, where the position is represented in terms of latitude, longitude, and/or altitude coordinates; x, y, and/or z coordinates; angular coordinates; or other representations. Such techniques may involve multilateration (or trilateration), which is the process of using geometry to estimate the position of a mobile device or other object of interest using distances traveled by different "positioning" (or "ranging") signals that are received, or reflected, by the mobile device or object of interest from different transceivers (e.g., terrestrial transceivers and/or satellites). If position information like the transmission time and reception time of a positioning signal from a transceiver can be estimated, then the difference between those times multiplied by the speed of light would provide an estimate of the distance traveled by that positioning signal from that transceiver to the mobile device or object of interest (and back again if the signal is reflected by the object of interest). Different estimated distances corresponding to different positioning signals from different transceivers can be used along with position information (e.g., the locations of those transceivers) to estimate the position of the mobile device or object of interest. Positioning systems and methods that estimate a position of a mobile device (in terms of latitude, longitude, and/or altitude) based on positioning signals from beacons (e.g., transceivers, and/or satellites) and/or atmospheric measurements are described in co-assigned U.S. Pat. No. 8,130,141, issued Mar. 6, 2012, and U.S. Pat. No. 9,057,606, issued Jun. 16, 2015. It is noted that the term "positioning system" may refer to satellite systems (e.g., Global Navigation Satellite Systems (GNSS) like GPS, GLONASS, Galileo, and Compass/Beidou), terrestrial transmitter systems, and hybrid satellite/terrestrial systems.

In some cases, the systems and methods described herein also account for multipath propagation of signals, wherein reflected signals reach the antennas (or antenna arrays) of the transceivers by two or more paths. In general, wireless channels are often characterized by a set of randomly varying multipath components with random phases and amplitudes. Therefore, to improve the accuracy of positioning systems using wireless signals, the processors of the transceivers can use a receiver algorithm that resolves the line-of-sight (LOS) path if present (it will be the first arriving path) or the path that arrives first (which may not necessarily be the LOS component).

The following methods can be used by the systems and methods described herein for processing multipath propagation signals: (1) the received signal is cross-correlated with the transmitted pseudo-random sequence (e.g. Gold code sequence, which is known at the receiver); (2) the receiver locates the first peak of the resulting cross-correlation function and estimates that the timing of the path that arrived first is the same as the timing indicated by the position of this peak. These methods can effectively mitigate issues with multipath propagation signals in cases where the lowest multipath separation is much larger than the inverse of the bandwidth available. However, that is not the case in some scenarios. Additionally, bandwidth is a precious commodity and a method which can resolve multipath propagation with a minimal amount of bandwidth is highly desired to improve the efficiency of the system.

In some cases, the systems and methods described herein use high-resolution methods for processing multipath propagation signals. High-resolution methods are a class of efficient multipath-resolution methods which use Eigen-space decompositions to locate the multipath components. Methods such as MUSIC, ESPIRIT fall under this class of resolution schemes. These methods are highly powerful schemes capable of resolving effectively much more closely spaced multipath components than traditional methods, for the same given bandwidth. Processing multipath propagation signals in wireless positioning systems is described further in co-assigned U.S. Pat. No. 8,130,141, issued Mar.

6, 2012, and U.S. Pat. No. 9,057,606, issued Jun. 16, 2015, which are incorporated by reference herein in their entirety for all purposes.

In some embodiments, the transceivers of the systems and methods described herein can use antenna arrays to provide directional information, which can in turn be used to determine the location of an object. Some aspects of using reflected ranging signals from objects in an environment are similar to using a terrestrial positioning system to estimate the positions of mobile devices, for example, where the position is represented in terms of latitude, longitude, and/or altitude coordinates; x, y, and/or z coordinates; angular coordinates; or other representations. Such techniques may involve triangulation (or multiangulation), which is the process of using geometry to estimate the position of a mobile device or another object of interest using directions obtained by receiving different "positioning" (or "ranging") signals using an antenna array of a transceiver that can determine a direction from which the signals are received (e.g., after having been reflected by an object in the background, or an OOI). Directions from a set of several (e.g., from 3 to 10) transceivers to an object (e.g., an OOI) can be used together to estimate the location of the object.

In some cases, more than one measurement, and/or more than one technique can be used to determine the location of an object (e.g., an OOI). Such double-checking, or cross-checking, can improve the accuracy of the system, and prevent the system from reporting erroneous (or inaccurate) locations for an object (e.g., an OOI). In some cases, an estimated location of an OOI is approved by the system using at least one cross-checking method before it is reported to a system that uses the location. For example, multilateration (or trilateration) techniques can be used to determine a first estimated location of an object. Multiangulation (or triangulation) can also be used to determine a second estimated location of an object. The first and second estimated locations can then be compared with one another, and if they agree, then one or both can be used as reported locations of the object, or an average of the first and second estimated locations can be used as a reported location of the object.

In other cases, the same technique can be used multiple times to determine estimated locations of the objects at several times. The estimated locations of the objects at the several times can be compared with one another, and if they are consistent with one another then one, some, or all of the estimated locations can be used as reported locations of the object. For example, if the estimated locations of the objects are too far apart from one another (e.g., greater than 2000 m apart over 1 second for an airborne object, or greater than about 45 m over 1 second for an object on the ground).

In other cases, two or more estimated locations of an object can be computed using two or more transceivers of a set of transceivers, and the individual estimated locations can be compared with one another. For example, estimated locations of objects can be made based on angle of arrival (e.g., using an antenna array) and estimated distance to one transceiver, and that procedure can be repeated across two or more of the transceivers for cross-checking purposes. In another example, estimated locations of objects can be made based on multilateration techniques using a sub-set of transceivers of a system, and the multilateration procedure can be repeated across different sub-sets of transceivers of the system for cross-checking purposes. Computing estimated locations independently using more than one transceiver and comparing them with one another can improve the accuracy of a reported location that is reported to a system that uses the object location (e.g., a security system, or a surveillance system). For example, an estimated location of an OOI can require approval by the system using at least one cross-checking method before it is reported to a system that uses the reported location. For example, the reported location can be an average of the estimated locations. Estimated locations can also be flagged as an outlier (or erroneous) and can be excluded from being reported. For example, if the estimated location is above a threshold distance away from an average of the set of estimated location, then the estimated location can be flagged as an outlier. Outlier estimated locations can be excluded from an average of the estimated locations in some cases.

In some cases, a plurality of estimated locations of an object can be computed using a set of transceivers, and the individual estimated locations can be compiled into a distribution of estimated locations. The distribution of estimated locations can then be used to calculate a reported location using the processors of the transceivers and the server. For example, the reported location can be an average, mean, median, or mode of the distribution. Outlier values can also be removed from the distribution. For example, if an estimated location is above a threshold distance away (e.g., 1 standard deviation, or 2 standard deviations) from an average (or mean, or median) of the distribution of estimated locations, then the estimated location can be flagged as an outlier. Outlier estimated locations can be excluded from the distribution when calculating the reported location.

In other cases, the estimated locations of objects can be compared with information from a database to determine if the estimated locations are to be used as a reported location. If the estimated locations are inconsistent with possible locations from the database, then the estimated locations of the objects are not reported. On the other hand, if the estimated locations are consistent with possible locations from the database, then the estimated locations of the objects can be reported to a system that uses the object location (e.g., a security system, or a surveillance system). For example, a database can include a map of the local terrain including altitudes of the ground, and the heights of buildings. If an estimated location of an object is in a "non-physical" location (e.g., physically impossible, improbable, or impractical), then the estimated locations of the objects are not reported. In some cases, additional context of the object is included in the determination of whether an estimated location is non-physical. For example, if a first estimated location of an OOI indicates that the OOI is an airborne object (e.g., a crewed or uncrewed aerial vehicle), and a second estimated location of the OOI indicates that the OOI is underground, or within the space of a building, then the first and/or the second estimated locations are not reported. In some cases, more measurements can be taken at additional times to determine if the first and/or the second estimated locations can be reported. For example, if a series of measurements determine several estimated locations of an OOI, and those measurements all correspond to a reasonably physical flight path of the OOI, and then a subsequent measurement indicates that the OOI is in a non-physical location (e.g., underground, or within a building, or a significant deviation from the reasonably physical flight path), then the subsequent non-physical location can be not reported, while the series of physically consistent locations are reported.

Determination of the physical or non-physical nature of estimated locations of objects using wireless positioning systems is described further in co-assigned U.S. Pat. Pub. 2023/0138050, filed Oct. 29, 2021, which is incorporated by reference herein in its entirety for all purposes. The systems and methods described in the above publication can be used in the object detection systems and methods described herein to improve the accuracy of the location determination of the systems and methods described herein. The systems and methods described in the above publication can also be used to determine a background, for example, by incorporating buildings and/or terrain from outside databases, or to improve the object location determination for objects in the background.

In some examples of the object detection systems described herein, information from a database can be used to determine locations of objects in the background. For example, a database of known terrain altitudes, natural features (e.g., trees, mountains), and/or man-made structures (e.g., buildings, bridges) can be used by the server to determine a background of an environment. Then the object detection system (including transceivers and server) can be used to detect the presence (or absence) of one or more OOIs from the environment. In some cases, measurements of the object detection system (including transceivers and servers) can be used together with information from a database to determine the locations of objects in a background of an environment.

In some cases, a first reported location of an object can be reported to a system that uses the first reported location of an object to trigger an alarm. For example, the system could be a surveillance system and the alarm could be an indication that there is an intruder, or that an object has been moved without authorization. The alarm can include a visual alarm, audible alarm, and/or sending communications (e.g., emails, text messages, phone calls) to security personnel.

In some cases, a first reported location of an object can be reported to a system that uses the first reported location of an object to trigger a first-level alarm. Subsequently, a second-level alarm can be triggered if a second reported location of the object confirms the first reported location. Alternatively, if the second reported location of the object is inconsistent with the first reported location, then the first alarm can be stopped or cancelled. For example, the system could be a surveillance system and the first level alarm could be a visual alarm (e.g., flashing lights), and the second-level alarm could be an audible alarm (e.g., a siren). The first-level and second-level alarms can include, visual alarms, audible alarms, and/or sending communications (e.g., emails, text messages, phone calls) to security personnel.

Figure 1B:
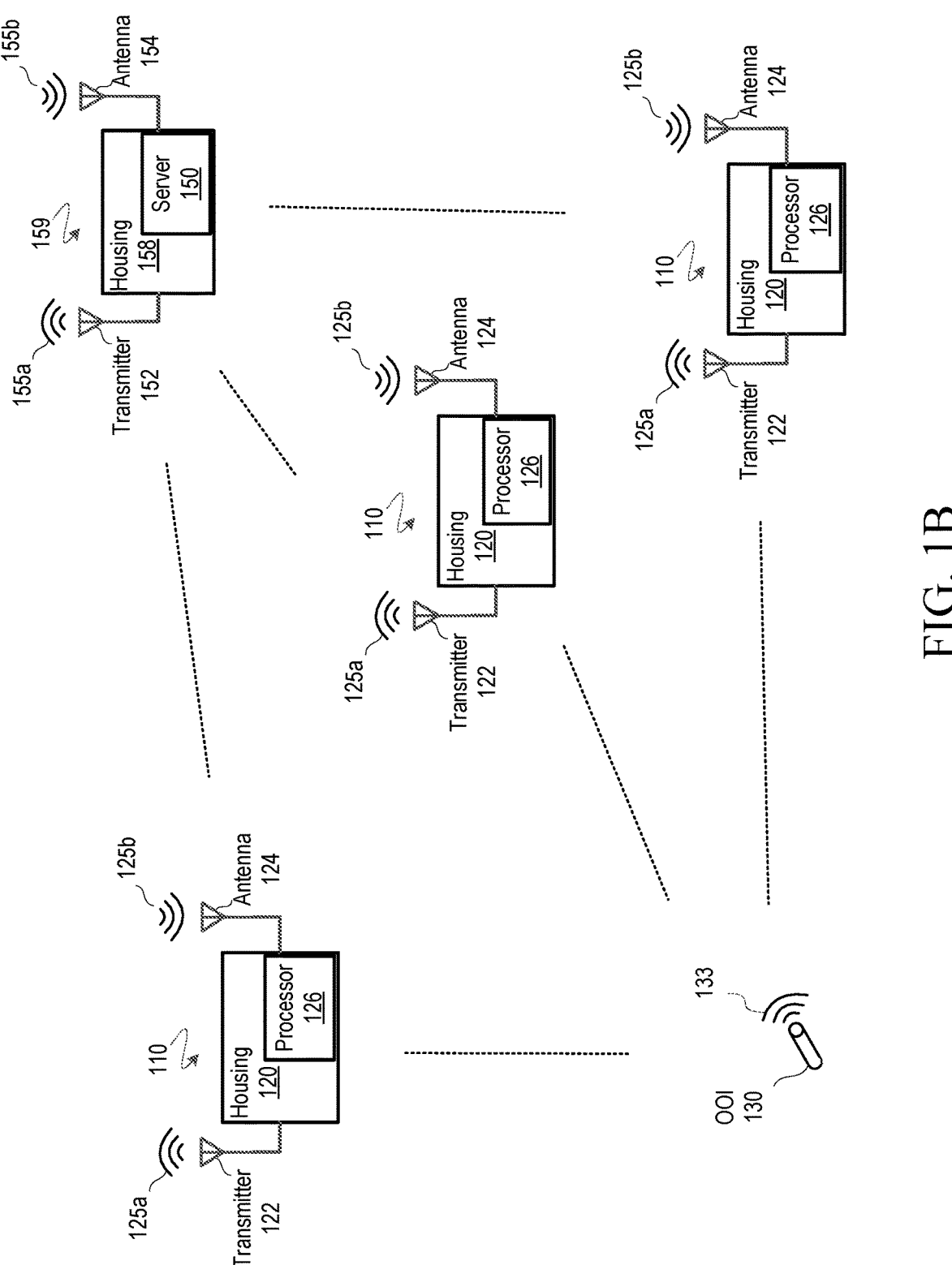
FIG. 1B shows a schematic example of a system for detecting one or more objects, including transceivers and a server system, in accordance with some embodiments.

FIGS. 1A and 1B show schematic examples of systems for detecting one or more objects, including transceivers 110 and server system 159. Each transceiver 110 includes one or more antenna arrays. In FIG. 1A, each transceiver 110 includes a transmit/receive antenna 123 (i.e., "Tx/Rx antenna") that is both a transmitter and a receiver, and a processor 126. In FIG. 1B, each transceiver 110 includes a transmitter 122, an antenna 124 (or an antenna array), and a processor 126. The transceivers of the systems and methods described herein can have one or more antenna arrays that each function as transmitters to transmit signals 125a and/or receivers to receive signals 125b. FIG. 1A shows an example of transceivers 110 having a single Tx/Rx antenna array for transmitting signals 125a and receiving signals 125b, while FIG. 1B shows an example where the transceivers 110 each have a transmit antenna (or antenna array) that functions as the transmitter 122 to transmit signals 125a, and an antenna array 124 that receives signals 125b.

The processors 126 of transceivers 110 in FIGS. 1A and 1B are used to generate the signals 125a to be transmitted. In some cases, transmitted signals 125a can have frequencies in the multilateration location monitoring systems band (M-LMS), for example, from 902 MHz to 928 MHz, or from 904 MHz to 909.75 MHz. Signals 125*a* generated using processor 126 can be modulated to include various information (e.g., ranging signals, communication signals, etc.), and such that signals 125*a* from all transceivers 110 can also form a code division multiple access (CDMA) and/or time division multiple access (TDMA) network. Signals 125*a* can reflect off of an OOI 130 to form reflected signals 133. The antennas 123 or 124 (or antenna arrays) can then receive signals 125*b*, which can include the reflected signals 133. The processors 126 can then process the received signals 125*b* to determine a location of the OOI 130. In some cases, the one or more antenna arrays (Tx/Rx antenna 153, or antenna 154) of each transceiver 110 is an antenna array configured to determine a direction from which a received signal 125*b* was sent, for example, to determine a direction from the transceiver 110 to the OOI 130.

In some cases, transceivers 110 in FIGS. 1A and 1B include housing 120 that encloses the processor 126, and the transmitter 122 and the antenna 124 are coupled to the housing 120.

The processors 126 of each transceiver 110 in FIGS. 1A and 1B can also generate signals 125*a* to be transmitted by the transmitters 122 for communication with a server 150. Server system 159 includes the server 150, and also includes one or more antenna arrays. In FIG. 1A, server system 159 includes a transmit/receive antenna 153 (i.e., "Tx/Rx antenna") that is both a transmitter and a receiver, and a server 150. In FIG. 1B, server system 159 includes a transmitter 152, and an antenna 154 (or an antenna array), all of which can be coupled to housing 158. The TX/Rx antenna 153, or the transmitter 152 and antenna 154 can be used to send signals 155*a* and receive signals 155*b* for communication with the transceivers 110, and optionally with another system (e.g., the cloud, a network, the internet, etc.). In some cases, the one or more antenna arrays (Tx/Rx antenna 153 or antenna 154) of server system 159 is an antenna array configured to determine a direction from which a received signal 155*b* was sent, for example, to determine a direction from the server system 159 to a transceiver 110. In other examples, the systems and methods for detecting objects described herein can include more than one server. For example, the systems and methods for detecting objects described herein can include from 1 to 10, or from 10 to 100, or more than 100 transceivers (like those of transceivers 110), and can include from 1 to 10, or from 10 to 100, or more than 100 servers (like those of server system 159).

Figure 1C:
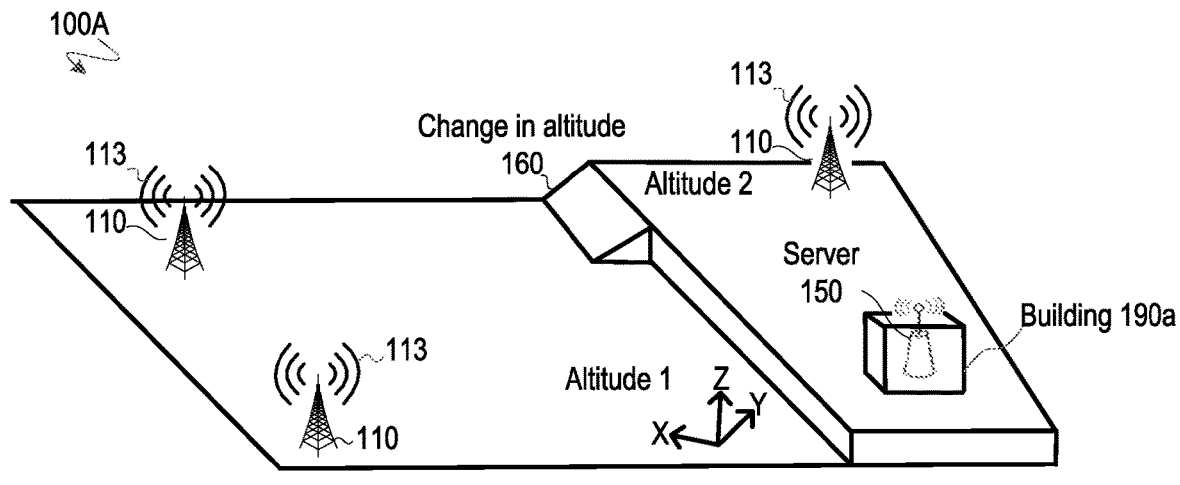
FIGS. 1C and 1D show examples of a system for detecting one or more objects in an environment at a first and second moment in time, respectively, wherein an object of interest (OOI) is not present in the environment at the first moment in time and is present in the environment at the second moment in time, in accordance with some embodiments.
Figure 1D:
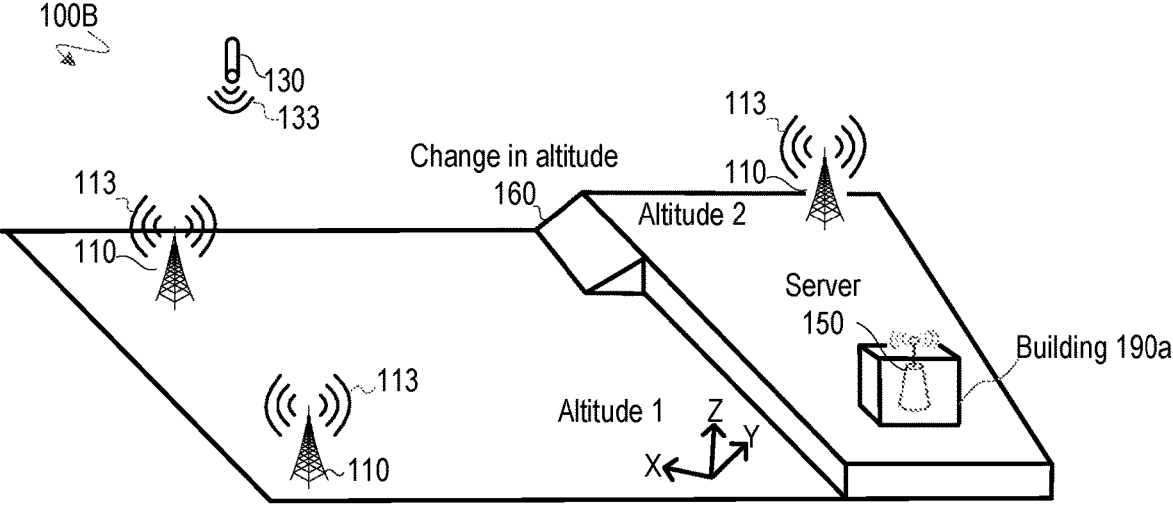

FIGS. 1C and 1D show examples of a system for detecting one or more objects in an environment at a first and second moment in time, respectively. FIG. 1C shows an example of an environment 100A at a first moment in time, and FIG. 1D shows an example of a similar environment 100B at a second moment in time, wherein an object of interest 130 (OOI) is not present in the environment 100A at the first moment in time and is present in the environment 100B at the second moment in time. The environments 100A and 100B each include a background, a system for detecting the OOI 130, and optionally include the OOI 130. The background in this example includes the ground (including altitude 1, altitude 2, and change in altitude 160), and a building 190*a*. The system for detecting the OOI 130 includes transceivers 110 and server 150. The transceivers 110 can be mounted on towers or on any structures (e.g., buildings, poles, the ground, etc.). The server 150 can be housed in a building 190*a*. Each transceiver 110 is configured to send and receive signals 113 using the transmitter 122 and the antenna 124 (or antenna array) respectively.

Signals 113 include both transmitted signals 125*a* and received signals 125*b*. Signals 113 are transmitted from the transmitters 122 of the transceivers 110. Signals 113 reflect off of objects in the environment (e.g., objects in the background and/or the OOI 130), and all or a portion of the emitted signals 113 are received by the antennas 124 (or antenna arrays) of the transceivers 110. The processors 126 of the transceivers 110 process the received signals 113 to determine locations of objects in the environments. For example, the processors 126 and server 150 could process the signals 113 to create a three-dimensional map of the environment 100A or 100B.

In some cases, multilateration techniques can be used to determine an estimated location of an object (in the background, or the OOI 130), wherein round-trip times for the plurality of signals 113 to be transmitted, reflected, and received by the transceivers 110 can be calculated using the processors 126 of the transceivers 110, and the information can be sent to the server 150, which can translate the plurality of round-trip times into distances from the object to each of the transceivers 110. The server 150 can then estimate the location of the object (in the background, or the OOI 130) using the plurality of distances from the object to each of the transceivers 110.

In some cases, the signals 113 reflect off of multiple objects before being received by the antennas 124 (or antenna arrays) of the transceivers 110. Such multipath propagation effects can also be taken into account by the processors 126 of the individual transceivers 110, and/or by the server 150, when computing a location of an object (in the background, or the OOI 130).

In other examples, each transceiver 110 can have an array of antennas 124 configured to provide direction (or angle) between the transceiver 110 and the object (in the background, or the OOI 130). In such cases, one transceiver 110 could be capable of providing an estimate of the location of the object (in the background, or the OOI 130) by determining a distance (e.g., from a round-trip time of the signal 113) and the direction from the antenna array 124.

In some cases, more than one technique is used to provide more than one estimated location of the object (in the background, or the OOI 130), and the different estimated locations are compared to one another . . . .

In some cases, transceivers 110 are configured to detect a Doppler shift in transmitted versus received signals to additionally detect relative motion of an OOI compared to the transceiver. For example, a transceiver 110 can be stationary, and a difference between the frequency of a transmitted signal 125*a* and a received signal 125*b* (that was a reflected signal 133 from OOI 130) can be analyzed using the processor 126 of the transceiver to determine a magnitude of motion of the OOI 130. The server 150 can process such Doppler shift information from multiple transceivers 110 to determine an estimated velocity (speed and direction) of the OOI 130. In some cases, the processors 126 and server 150 can therefore be used to determine an estimated location and estimated velocity of an OOI 130.

Figure 2A:
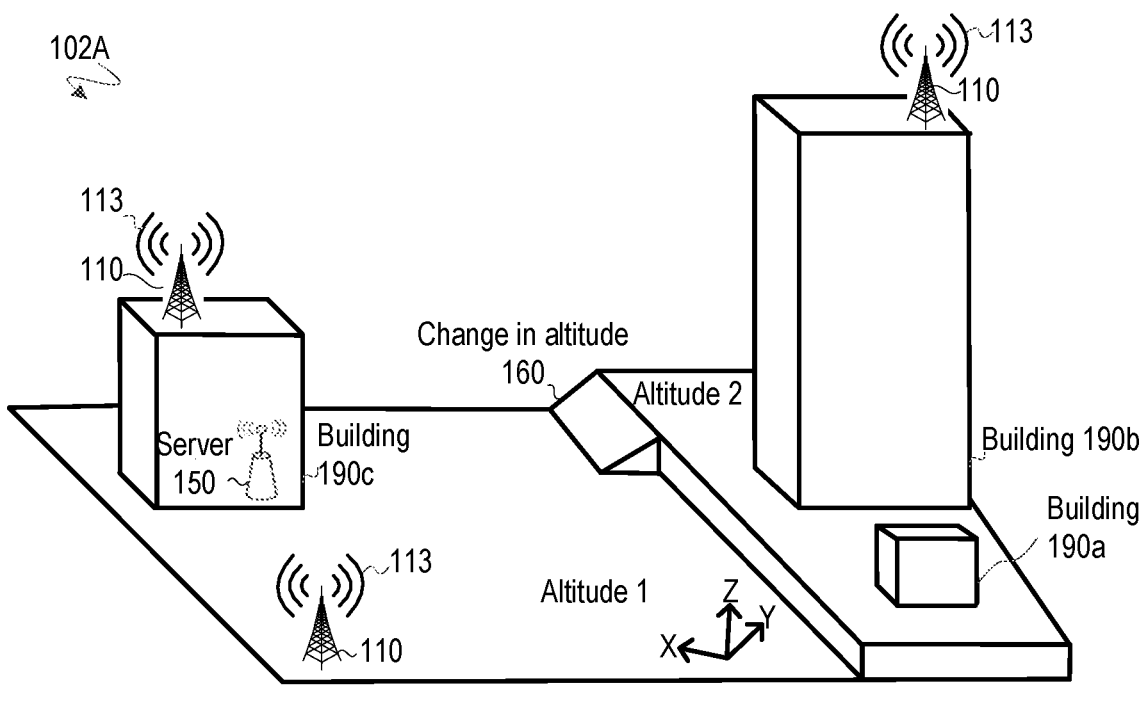
FIGS. 2A and 2B show examples of a system for detecting one or more objects in an environment at a first and second moment in time, respectively, wherein an OOI is not present in the environment at the first moment in time and is present in the environment at the second moment in time, wherein the environment includes buildings, in accordance with some embodiments.
Figure 2B:
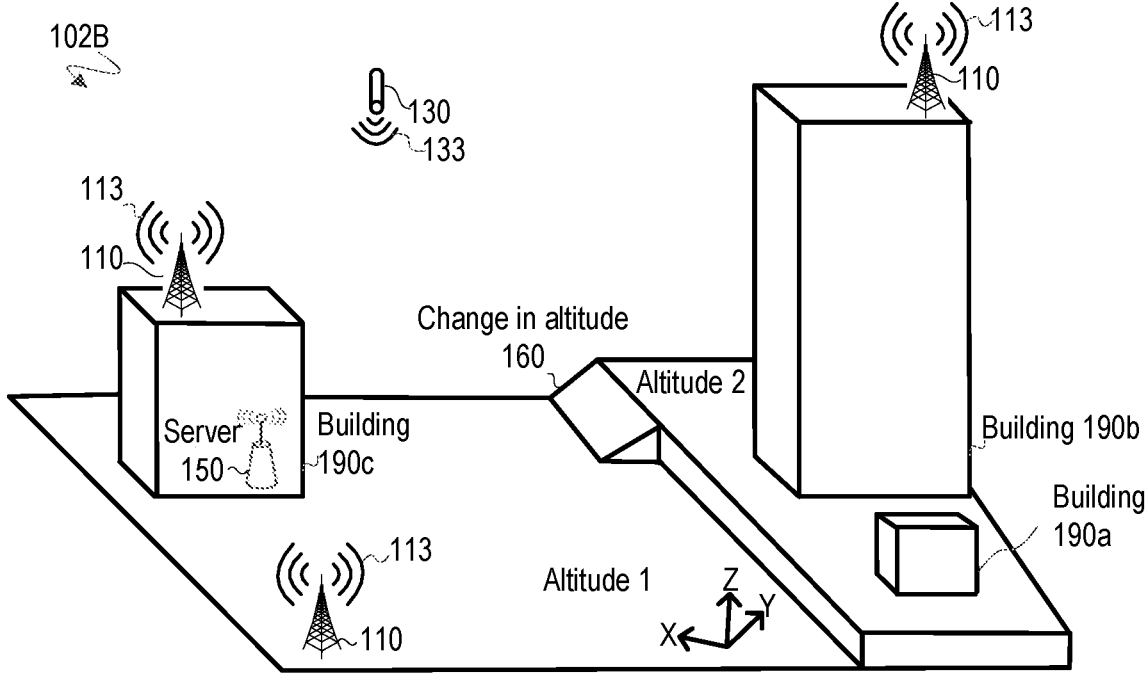

FIGS. 2A and 2B show examples of a system for detecting one or more objects in an environment at a first and second moment in time, respectively. FIG. 2A shows an example of an environment 102A at a first moment in time, and FIG. 2B shows an example of a similar environment 102B at a second moment in time, wherein an object of interest 130 (OOI) is not present in the environment 102A at the first moment in time and is present in the environment 102B at the second moment in time. The environments 102A and 102B in this example each include a background, a system for detecting the OOI 130, and optionally include the OOI 130. The background in this example includes the ground (including altitude 1, altitude 2, and change in altitude 160), and three buildings 190a, 190b, and 190c. The system for detecting the OOI 130 includes transceivers 110 and server 150. Some transceivers 110 are mounted buildings (190b and 190c) in this example. The system for detecting the OOI 130 functions similar to the system described above with respect to FIGS. 1A-1D.

Figures 3A, 3B:
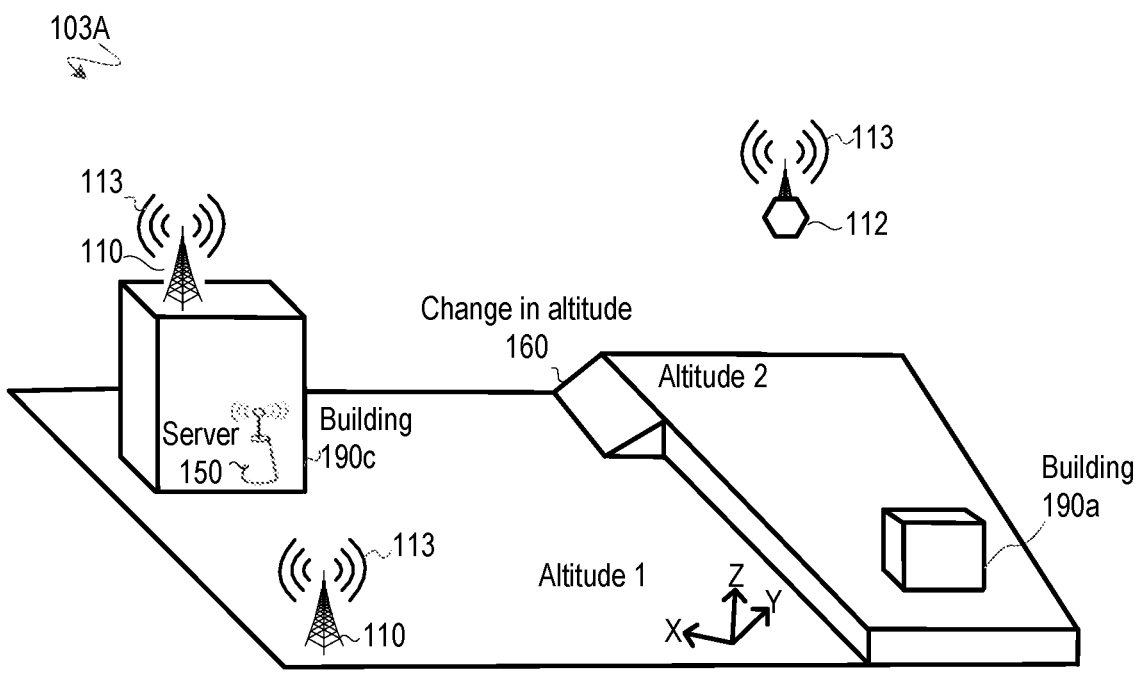
FIGS. 3A and 3B show examples of a system for detecting one or more objects in an environment at a first and second moment in time, respectively, wherein an OOI is not present in the environment at the first moment in time and is present in the environment at the second moment in time, wherein a transceiver of the system is mounted to an aerial vehicle (e.g., an unmanned aerial vehicle, or a drone).

FIGS. 3A and 3B show examples of a system for detecting one or more objects in an environment at a first and second moment in time, respectively. FIG. 3A shows an example of an environment 103A at a first moment in time, and FIG. 3B shows an example of a similar environment 103B at a second moment in time, wherein an object of interest 130 (OOI) is not present in the environment 103A at the first moment in time and is present in the environment 103B at the second moment in time. The environments 103A and 103B in this example each include a background, a system for detecting the OOI 130, and optionally include the OOI 130. The background in this example includes the ground (including altitude 1, altitude 2, and change in altitude 160), and two buildings 190a and 190c. The system for detecting the OOI 130 includes transceivers 110 and server 150. A transceiver 112 in this example is mounted to an aerial vehicle (e.g., an unmanned aerial vehicle, or a drone). The system for detecting the OOI 130 functions similar to the system described above with respect to FIGS. 1A-1D.

Figure 4A:
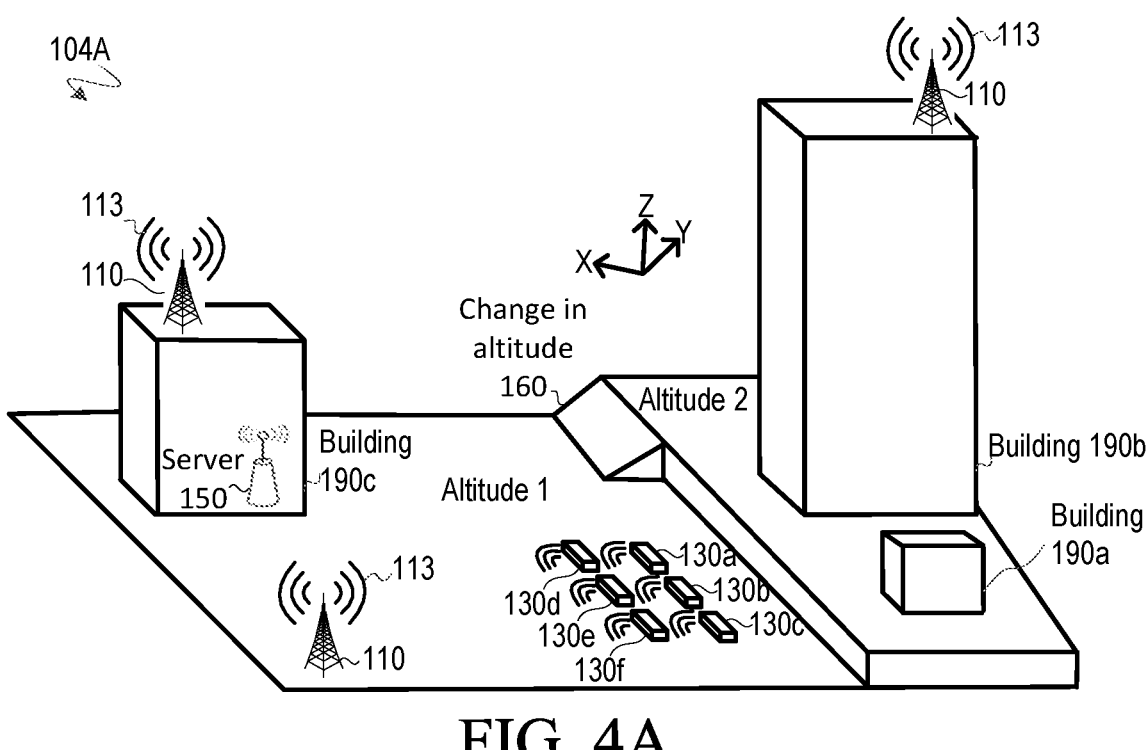
FIGS. 4A and 4B show examples of a system for detecting one or more objects in an environment at a first and second moment in time, respectively, wherein an OOI is present in the environment at the first moment in time and the OOI is not present in the environment at the second moment in time, in accordance with some embodiments.
Figure 4B:
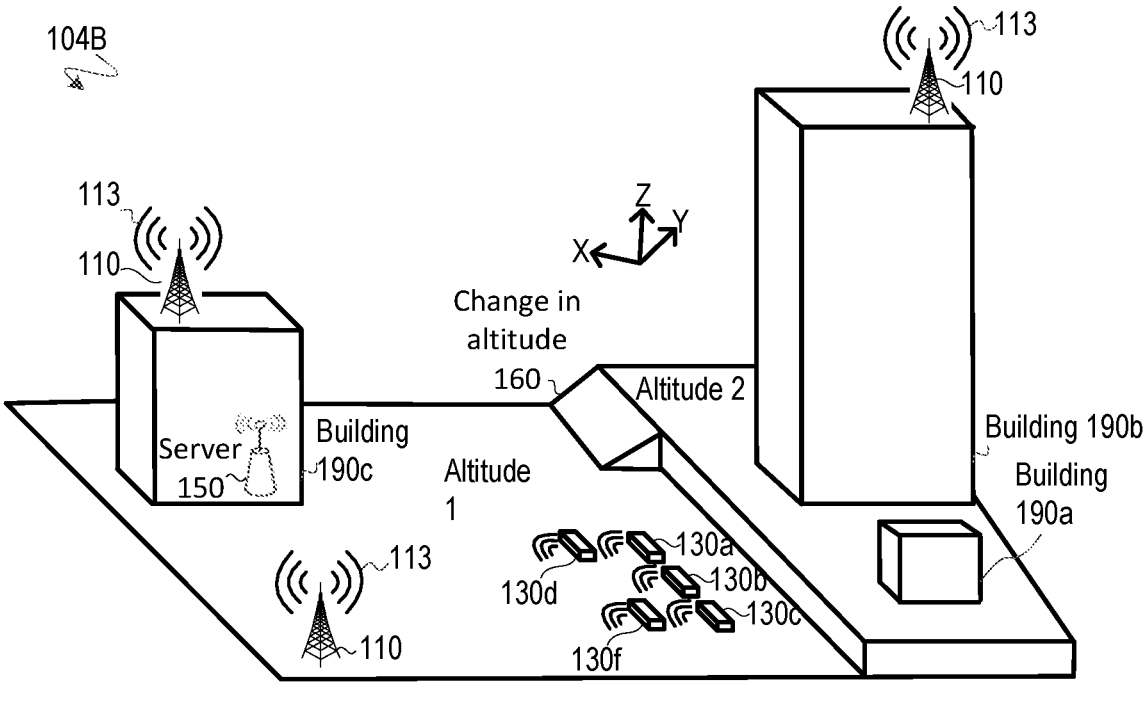

FIGS. 4A and 4B show examples of a system for detecting one or more objects in an environment at a first and second moment in time, respectively. FIG. 4A shows an example of an environment 104A at a first moment in time, and FIG. 4B shows an example of a similar environment 104B at a second moment in time. In contrast to the previous examples, the OOI 130e is present in the environment 104A at the first moment in time and is not present in the environment 104B at the second moment in time. The environments 104A and 104B in this example each include a background, a system for detecting the OOI 130e, and optionally include the OOI 130e. The background in this example includes the ground (including altitude 1, altitude 2, and change in altitude 160), and three buildings 190a, 190b, and 190c. The system for detecting the OOI 130e includes transceivers 110 and server 150. The system for detecting the OOI 130c functions similar to the system described above with respect to FIGS. 1A-1D. In this case, however, the OOI 130e is present in the environment 104A at the first moment in time. In other words, the environment 104A at the first moment in time includes the background and the OOI 130e. At the second moment in time, environment 104B includes the background but does not include the OOI 103e. It can be useful to detect when an OOI (e.g., 130c) leaves (or is removed from) an environment, for example, to detect theft. In some embodiments, objects 130a-130f are cars parked on a street or in a commercial lot, and the system for detecting the objects 130a-130f is configured to detect when one or more of the objects 130a-130f are removed from the environment.

FIGS. 5A and 5B show examples of a system for detecting one or more objects in an environment at a first and second moment in time, respectively. FIG. 5A shows an example of an environment 105A at a first moment in time, and FIG. 5B shows an example of a similar environment 105B at a second moment in time. In this example, the transceivers 110 are deployed within an indoor environment of building 190a, and can determine locations of objects of the background of the indoor environment (e.g., walls of building 190a, and object 180), and one or more OOIs 130a-130g that are in the indoor environment. In this example, OOI 130a has moved between the first and second moments in time. Additionally, OOI 130g is a person that was not present at the first moment in time, and is present at the second moment in time. The system for detecting the OOIs 130a and 130g includes the transceivers 110 and the server 150, which function similarly to the system described above with respect to FIGS. 1A-1D. It can be useful to detect when an OOI (e.g., 130a) moves, arrives, or leaves an indoor environment. For example, building 190a can be a commercial or industrial environment, such as a warehouse or manufacturing facility, and the system including the transceivers 110 and the server 150 can be used to track the locations of OOIs (e.g., pallets of goods, people, or partially manufactured products). The variations of the systems described with respect to FIGS. 1A-4B can also be used in such indoor environments.

FIGS. 6A-6E shows examples of antenna arrays that can be used to detect an OOI by determining a direction and/or distance between the antenna array and one or more OOIs. The directions in the examples shown in FIGS. 6A-6E are determined as deviations from magnetic north, however, an alternative reference direction can be used in other cases.

Figure 6A:
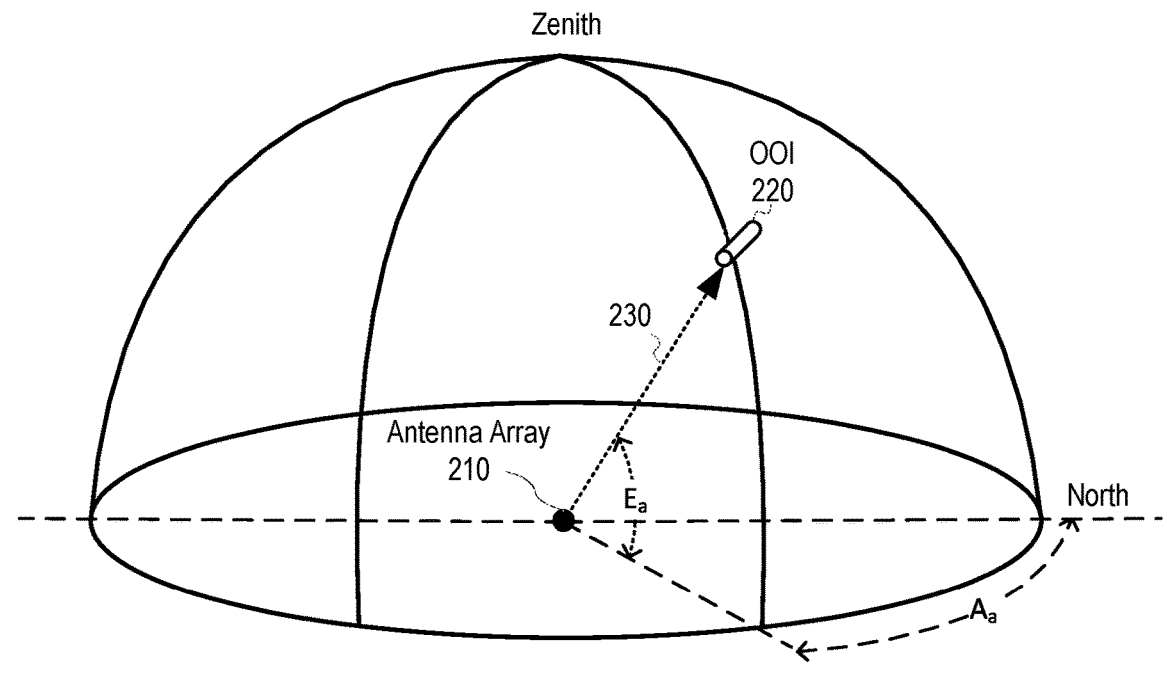
FIGS. 6A and 6B show examples of antenna arrays that can be used to detect an OOI by determining a direction and/or distance between the antenna array and one or more OOIs, in accordance with some embodiments.

FIG. 6A shows an example of an antenna array 210 (similar to antenna array 123 in FIG. 1A or antenna array 124 in FIG. 1B) detecting an OOI 220. The direction 230 between the antenna array 210 and the OOI 220 is defined using a polar coordinate representation with azimuthal angle $A_a$ and elevation angle $E_a$ from the reference direction (magnetic north, in this case). The distance between the antenna array 210 and the OOI 220 along direction 230 can also be determined using the antenna array 210 (e.g., using a round-trip time of a transmitted and reflected signal). Therefore, FIG. 6A shows an example of a single transceiver with antenna array 210 that can be used to determine an estimated location of OOI 220. In other cases, a set of transceivers, each having an antenna array 210 can be used to estimate a location of one or more OOIs.

Figure 6B:
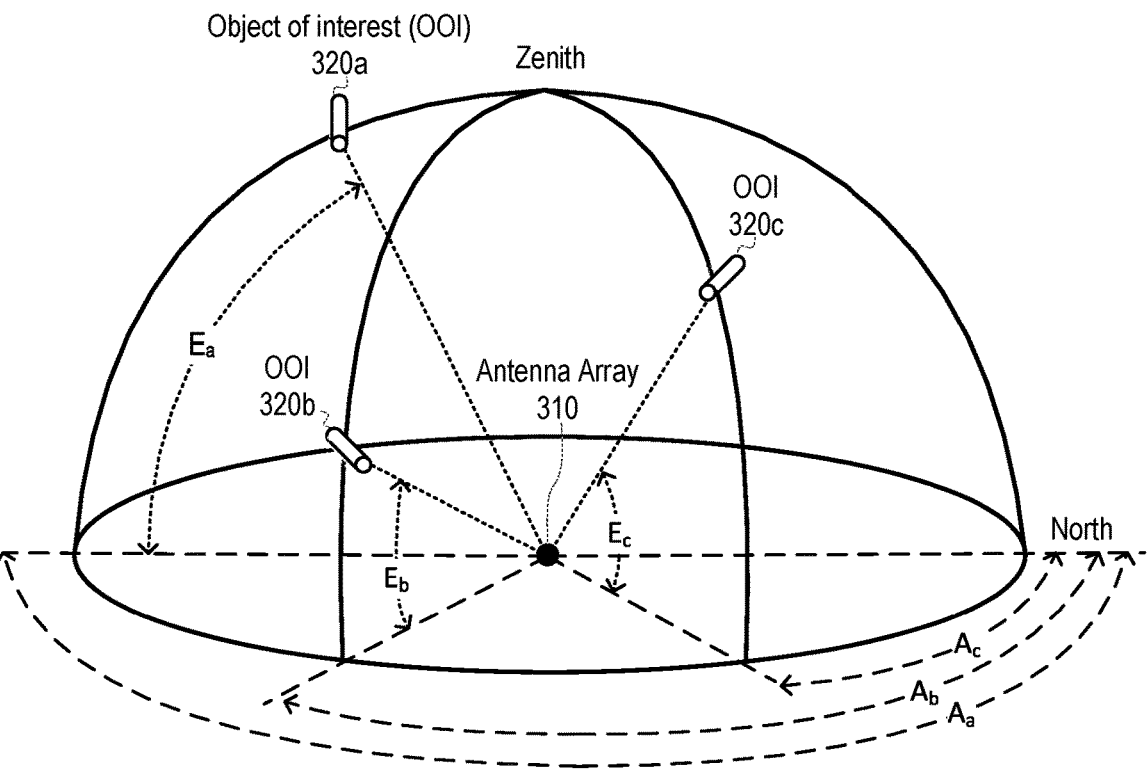

FIG. 6B shows an example of an antenna array 310 that is detecting multiple OOIs 320a, 320b, and 320c. Directions between antenna array 210 or 310 and spatially-distributed OOIs 320a, 320b, and 320c are defined using different combinations of azimuthal angles ($A_a$, $A_b$, and $A_c$), and elevation angles ($E_a$, $E_b$, and $E_c$), in this example.

Figures 6C, 6D:
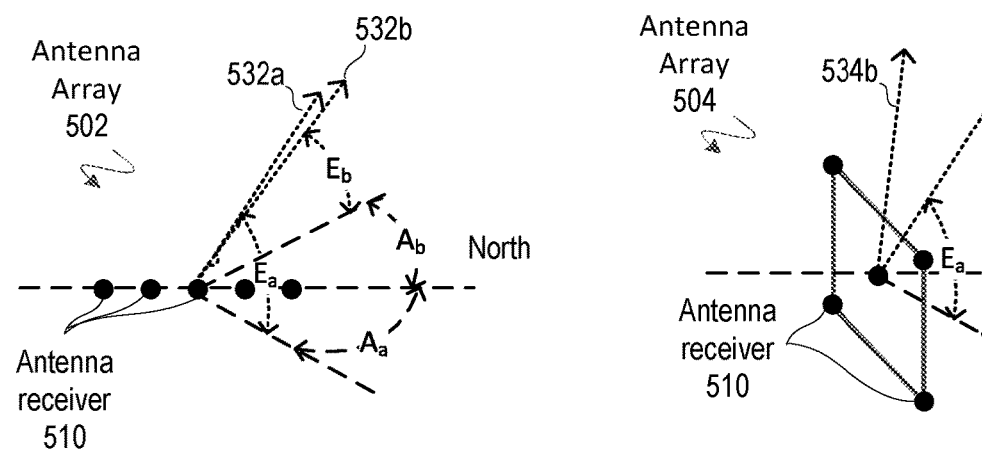
FIG. 6C shows an example of a 1D antenna array including a set of antenna receivers arranged in a line, in accordance with some embodiments.
FIG. 6D shows an example of a 2D antenna array including antenna receivers arranged in a plane, in accordance with some embodiments.

FIG. 6C shows an example of a 1D antenna array including a set of antenna receivers 510 arranged in a line. In this example, there may be more than one estimated direction 532a and 532b due to ambiguity in the signals received by the antenna receivers 510. For example, the OOI could actually be reflecting signal from direction 532a, but the antenna array 502 could estimate that the OOI is either towards direction 532a or 532b. A 1D antenna array can still be used, however, if multiple transceivers are used to determine an estimated location of an OOI (e.g., using multi-angulation methods, and/or multilateration methods). In the case of a 3D antenna array, there may be no such ambiguity and one direction can be estimated using the signals received by the antenna receivers 510.

FIG. 6D shows an example of a 2D antenna array including antenna receivers 510 arranged in a plane. In this example, there may be more than one estimated direction 534a and 534b due to ambiguity in the signals received by the antenna receivers 510. A 2D antenna array can still be used, however, if multiple transceivers are used to determine an estimated location of an OOI (e.g., using multi-angulation methods, and/or multilateration methods). In the case of a 3D antenna array, there may be no such ambiguity and one direction can be estimated using the signals received by the antenna receivers 510.

Figure 6E:
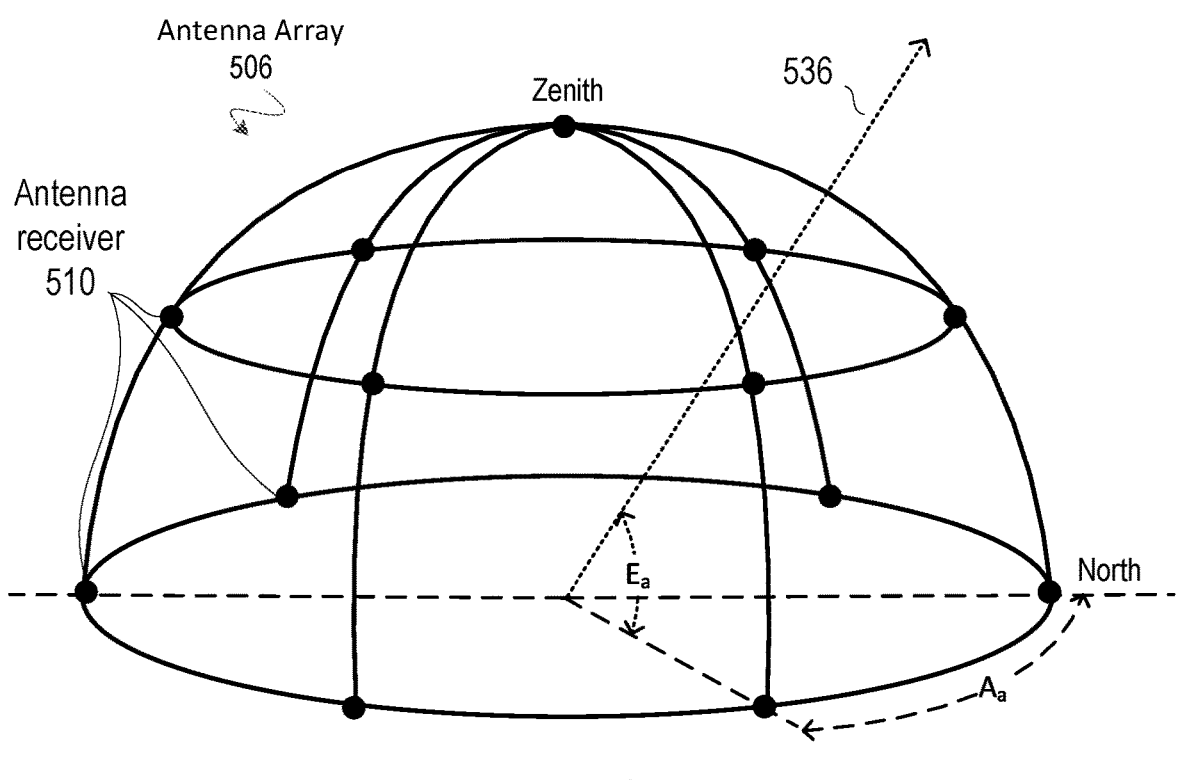
FIG. 6E shows an example of a 3D antenna array including antenna receivers arranged on the surface of a hemisphere, in accordance with some embodiments.

FIG. 6E shows an example of a 3D antenna array including antenna receivers 510 arranged on the surface of a hemisphere. The antenna array 506 can be used to determine a direction 536 between the object and the antenna array 506 as well as a distance from the antenna array to the object (e.g., using the round-trip time of a transmitted signal). Therefore, FIG. 6E shows an example of a single transceiver with antenna array 506 that can be used to determine an estimated location of one or more OOIs. In other cases, a set of transceivers, each having an antenna array 506 can be used to estimate locations of one or more OOIs.

Figure 6F:
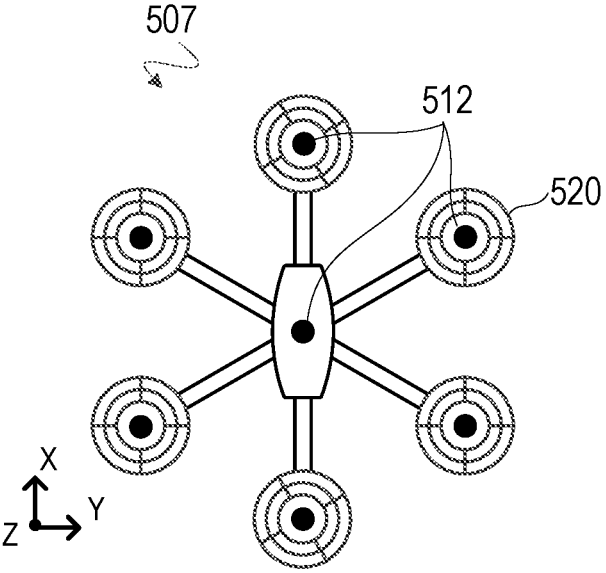
FIG. 6F shows a schematic top-down view of an unmanned aerial vehicle (UAV) with an example 3D antenna array including antenna receivers arranged on the surface of the UAV, in accordance with some embodiments.

FIG. 6F shows a schematic top-down view of a UAV 507 (or drone) with an example 3D antenna array including antenna receivers 512 arranged on the surface of UAV 507, in accordance with some embodiments. Antenna receivers 512 can also be used to transmit signals in some embodiments. In some cases, antenna arrays can be designed for use on a UAV like UAV 507 by maximizing the interspacing of antenna receivers 512. FIG. 6F shows an example where antenna receivers 512 are placed at opposite ends of a structure of UAV 507, approximately at the positions of the motors for the propellors 520. In some cases, the antenna receivers 512 can be arranged in approximately one x-y plane, or some antenna receivers 512 can be at different z-positions such that the antenna array is not all in one plane (as the x-, y- and z-directions are defined in FIG. 6F, and the z-direction is out of the page). For example, antenna receivers 512 can be arranged on posts or other structures from the frame of the UAV 507, for example, near the center of the UAV 507 or at the positions of the propellors 520. UAV 507 has six propellors, but similar antenna array designs could be used with UAVs with other geometries, such as having 4 propellors. The antenna array in FIG. 6F is shown with 7 antenna receivers 512, however, in other cases a different number of antenna receivers 512 can be used (e.g., from 2 to 10, or from 5 to 20).

Figure 6G:
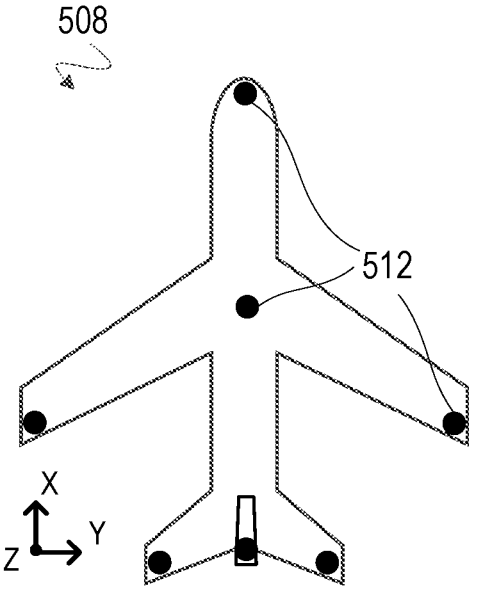
FIG. 6G shows a schematic top-down view of an aerial vehicle with an example 3D antenna array including antenna receivers arranged on the surface of the aerial vehicle, in accordance with some embodiments.

FIG. 6G shows a schematic top-down view of an aerial vehicle 508 with an example 3D antenna array including antenna receivers 512 arranged on the surface of aerial vehicle 508, in accordance with some embodiments. In some cases, antenna arrays can be designed for use on an aerial vehicle like aerial vehicle 508 by maximizing the interspacing of antenna receivers 512. In other words, in some cases, the distances between antenna receivers 512 can be as large as possible (or maximized). FIG. 6G shows an example where antenna receivers 512 are placed at opposite ends of a structure of aerial vehicle 508, approximately at the positions of the ends of the wings, nose, and tail of the aerial vehicle. This is an example of an antenna array with distances between antenna receivers 512 (or the interspacing of the antenna receivers 512) that are as large as possible given a particular aerial vehicle structure. In some cases, the antenna receivers 512 in FIG. 6G can be arranged in approximately one x-y plane, or some antenna receivers 512 can be at different z-positions such that the antenna array is not all in one plane (as the x-, y- and z-directions are defined in FIG. 6G, and the z-direction is out of the page). For example, antenna receivers 512 can be arranged on posts or other structures from the wings, a horizontal stabilizer, or a vertical stabilizer of the UAV 508. Similar antenna array designs could be used with aerial vehicles with similar but different geometries as that shown in FIG. 6G. The large size of an aircraft can accommodate a large interspacing between the antenna receivers 512, which can enable the antenna array to transmit and receive low frequency signals, for example less than 1 GHz, or less than 500 MHz, or from 100 MHz to 1 GHz.

The number of receive antennas can be greater or fewer than those shown in FIGS. 6C-6G. For example, an antenna array similar those shown in FIGS. 6C-6G can include from 10 to 100 antenna receivers 510. The spacing between antenna receivers 510 in FIGS. 6C-6G can be on the order of 1 wavelength of the received wireless signal. When a large number of antennae are used, the form factor of the receive antenna unit can become quite large, e.g., on the order of 10 wavelengths. For example, in a system based on a wireless signal with a frequency of 1 GHz, the signal wavelength is approximately 30 cm. As such, the form factor of the receive antennae array may need to be on the order of a few meters long. At 5 GHz, the wavelength is approximately 6 cm, and thus a similar antennae system could span less than 1 meter.

FIG. 7 is a flowchart of an example method 600 for detecting an OOI in an environment using the systems described herein, for example, the transceivers 110 of FIGS. 1A-5B, and/or transceiver 112 of FIGS. 3A and 3B. At block 610, a first set of transmitted signals is transmitted from a set of transceivers. Each transceiver of the set of transceivers comprises a transmitter, an array of one or more antennas, and a processor. At block 620, a first set of received signals is received by the set of transceivers. At block 630, the first set of received signals is processed using the respective processors of the set of transceivers and a server coupled to the respective processors of the set of transceivers to determine a background for an environment. For example, the environment can be any of those in FIGS. 1A-5B.

At block 640 of method 600, a second set of transmitted signals is transmitted from the set of transceivers, wherein the second set of transmitted signals is transmitted at a later time than the first set of transmitted signals. In some cases, the second set of transmitted signals can be transmitted a fraction of a second later, or multiple seconds later (e.g., from 1 ms to 10 seconds later). For example, a system can use from 10 ms to 500 ms, or 100 ms, transmission dwells (or slots) for each transceiver of a set of transceivers. The transmission period can be from 100 ms to 10 seconds, or 1 second, which can be broken up into 10 to 1000 slots, or 10, slots that are rotated (or cycled) among the different transceivers. After a full period, then the period (or cycle) would start again and each transceiver would have the chance to transmit again. At block 650, a first set of reflected signals is received by the set of transceivers, the first set of reflected signals comprising all or a portion of the second set of transmitted signals that were reflected off of an OOI. At block 660, the first set of reflected signals is processed using the processors and the server to determine a first estimated location of the OOI. For example, the processors and server can detect a change between the first set of received signals and the first set of reflected signals, and the system can estimate that the location of the OOI is within a certain range (e.g., the range of the detection system).

In some cases, the OOI is not within the range of detectability of the system in block 630 (where the background is detected), and therefore the processors and server can determine that the OOI has entered the space in which the system can detect OOIs. In other cases, the OOI is present in the signal detected in block 630 (when the background is detected). In such cases, if the OOI is detected at a different position, or if the OOI is missing from the space in which the system can detect OOIs, then the processors and server can determine that the OOI has moved or has been removed from the space.

At block 670 of method 600, the processors and the server are used to determine if the first estimated location of the OOI is to be a reported location of the OOI, and if the first estimated location of the OOI is determined to be a reported location of the OOI, then reporting the reported location of the OOI to a system that utilizes the reported location of the OOI. For example, the system can be a security system configured to detect intruders (e.g., aerial vehicles, vehicles on the ground, people in a space), or to detect theft (e.g., if an object is removed without authorization). In other cases, the system can be a surveillance system configured to track the locations and movements of objects, for example an air traffic control system, a system to monitor roadway traffic patterns, a system to track shipping containers in a shipyard, or a system to track the movement of people within a space.

Figure 8:
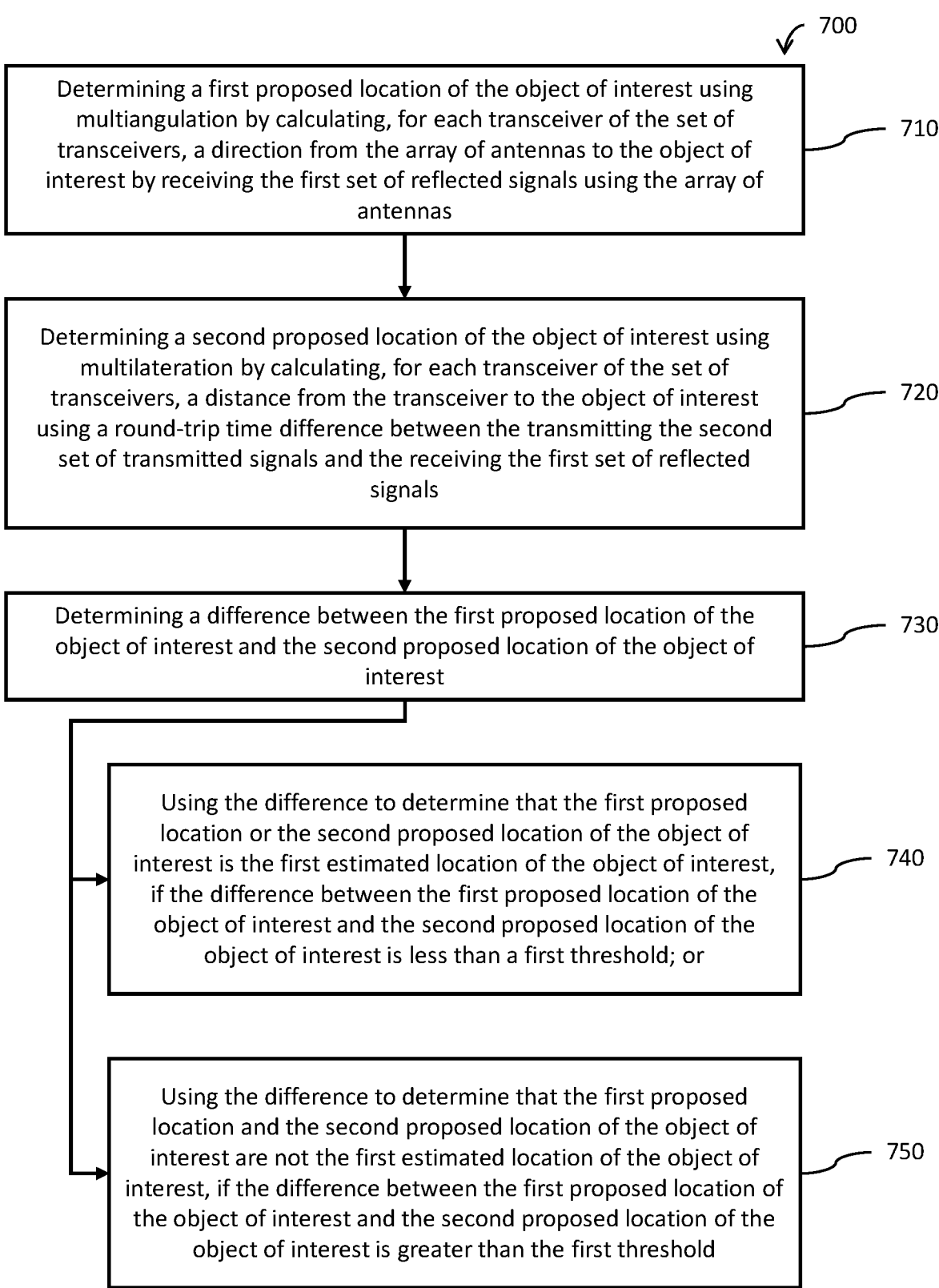

FIG. 8 is a flowchart of an example method 700 for detecting an object in an environment. Block 660 includes the processing of the first set of reflected signals using the processors and the server to determine a first estimated location of the object of interest, and method 700 is one embodiment of block 660 of method 600, in some embodiments. In other words, method 700 describes one possible way that the first set of reflected signals can be processed, using the processors and the server, to determine the first estimated location of the object of interest. At block 710 of method 700, a first proposed location of the OOI is determined using multiangulation. At block 710, the first proposed location of the OOI is determined by calculating, for each transceiver of the set of transceivers, a direction from the array of antennas to the OOI by receiving the first set of reflected signals using the array of antennas. At block 720, a second proposed location of the OOI is determined using multilateration. At block 720, the second proposed location of the OOI is determined by calculating, for each transceiver of the set of transceivers, a distance from the transceiver to the OOI using a round-trip time difference between the transmitting the second set of transmitted signals and the receiving the first set of reflected signals. At block 730, a difference is determined between the first proposed location of the OOI and the second proposed location of the OOI. At block 740, if the difference between the first proposed location of the OOI and the second proposed location of the OOI is less than a first threshold, then the first proposed location or the second proposed location of the OOI is used as the first estimated location of the OOI. Alternatively, at block 750, if the difference between the first proposed location of the OOI and the second proposed location of the OOI is greater than the first threshold then the first proposed location and the second proposed location of the OOI are not used as the first estimated location of the OOI. In general, threshold selection can be a function of the accuracy and/or sensitivity of the object detection system. For example, a system using the M-LMS band could have position accuracies on the order of meters (depending on the deployment scenario), and outlier measurements can be rejected when outside that range. For example, the threshold can be from 1 meter to 100 meters, or 5 meters, or 10 meters, or 50 meters.

Returning to FIG. 7, in some embodiments of the method 600, the processing of the first set of reflected signals to determine the first estimated location of the OOI further comprises calculating, for each transceiver of the set of transceivers, a direction from the array of antennas to the OOI. The direction can be calculated by receiving the first set of reflected signals using the array of antennas, and using the calculated directions from each of the arrays of antennas to the OOI to determine a first proposed location of the OOI. This first proposed location of the OOI can then be determined to be the estimated location of the OOI, for example, if it is corroborated by a previous or subsequent estimated location of the OOI, or by a different method of determining the location of the OOI.

In some embodiments of the method 600, the processing of the first set of reflected signals to determine the first estimated location of the OOI further comprises calculating, for each transceiver of the set of transceivers, a distance from the transceiver to the OOI. The set of distances can be calculated using a round-trip time difference between transmitting the second set of transmitted signals and the receiving the first set of reflected signals, and using the calculated distances to determine a first proposed location of the OOI. This first proposed location of the OOI can then be determined to be the estimated location of the OOI, for example, if it is corroborated by a previous or subsequent estimated location of the OOI, or by a different method of determining the location of the OOI.

In some embodiments, method 600 further comprises transmitting a third set of transmitted signals from the set of transceivers, wherein the third set of transmitted signals is transmitted at a later time than the second set of transmitted signals. These signals can be reflected off of an OOI, and received by the set of transceivers as a second set of reflected signals. The second set of reflected signals can comprise all or a portion of the third set of transmitted signals that were reflected off of the OOI. The second set of reflected signals can be processed using the respective processors of the set of transceivers and the server to determine a second estimated location of the OOI. A difference between the first estimated location of the OOI and the second estimated location of the OOI can be determined, and the difference can be used to determine if the first estimated location or the second estimated location of the OOI is to be used as a reported location of the OOI. If the difference between the first estimated location of the OOI and the second estimated location of the OOI is less than a second threshold, then the first estimated location or the second estimated location of the OOI can be used as a reported location of the OOI. Alternatively, if the difference between the first estimated location of the OOI and the second estimated location of the OOI is greater than the second threshold then the first estimated location or the second estimated location of the OOI is not used as a reported location of the OOI. In some cases, the third set of transmitted signals is transmitted at a time less than 1 second after the second set of transmitted signals is transmitted, and wherein the second threshold is 2000 meters.

In some embodiments, method 600 further comprises transmitting a plurality of sets of transmitted signals from the set of transceivers comprising the first and second sets of transmitted signals, wherein the plurality of sets of transmitted signals are transmitted at a plurality of times, and wherein each of the plurality of times are different from one another. In such an example, the plurality of sets of transmitted signals can reflect off of an OOI to produce a plurality of sets of reflected signals comprising the first set of reflected signals. The plurality of sets of reflected signals can be received by the set of transceivers, and the plurality of sets of reflected signals can be processed using the processor and the server to determine a plurality of estimated locations of the OOI. The processors and the server can determine that a particular estimated location of the plurality of estimated locations of the OOI is a reported location of the OOI, if the particular estimated location is consistent with another estimated location of the plurality of estimated locations of the OOI. Alternatively, the processors and the server can determine that a particular estimated location of the plurality of estimated locations of the OOI is not a reported location of the OOI, if the particular estimated location is inconsistent with another estimated location of the plurality of estimated locations of the OOI.

In some embodiments of the method 600, the first and second sets of transmitted signals comprise a frequency in the Location and Monitoring Service (LMS) frequency band.

In some embodiments of the method 600, the first and second sets of transmitted signals comprise wireless communication signals comprising spread spectrums.

In some embodiments, method 600 further comprises measuring a set of Doppler shifts between a first set of frequencies of the second set of transmitted signals and a second set of frequencies of the first set of reflected signals using the arrays of antennas of the set of transceivers, and processing the set of Doppler shifts using the processors and the server to determine a first velocity of the OOI.

In some embodiments of the method 600, a transceiver of the set of transceivers is coupled to an unmanned aircraft system (UAS).

In some embodiments of the method 600, the processing of the first set of reflected signals using the processors and the server to determine the first estimated location of the OOI further comprises wirelessly communicating communication signals from the transmitters of the set of transceivers to the server, wherein the communication signals comprise information about the received first set of reflected signals from the processors of the set of transceivers.

In some embodiments of the method 600, the environment is an outdoor environment, and the OOI is an airborne object.

In some embodiments of the method 600, the environment is an outdoor environment, and the OOI is a person, an animal, a ground-based object, or a ground-based vehicle.

In some embodiments of the method 600, the environment is an indoor environment, and wherein the OOI is a person.

In some embodiments of the method 600, the processing of the first set of received signals to determine the background for the environment further comprises accounting for multipath propagation of the first set of transmitted signals reflecting off of one or more objects in the environment.

In some embodiments of the method 600, the processing of the first set of reflected signals to determine the first estimated location of the OOI further comprises accounting for multipath propagation of the first set of reflected signals reflecting off of one or more objects in the environment in addition to reflecting off of the OOI.

In some embodiments of the method 600, the array of antennas of each transceiver of the set of transceivers comprises a 3-dimensional array of antenna elements.

In some embodiments, method 600 further comprises transmitting a third set of transmitted signals from the set of transceivers, wherein the third set of transmitted signals is transmitted at a later time than the second set of transmitted signals, and receiving a second set of reflected signals by the set of transceivers, the second set of reflected signals comprising all or a portion of the third set of transmitted signals that were reflected off of the background, but substantially no signals reflecting off of the OOI. The second set of reflected signals can be processed using the respective processors of the set of transceivers and the server to determine that the OOI is not at the first estimated location at the later time.

Figure 9:
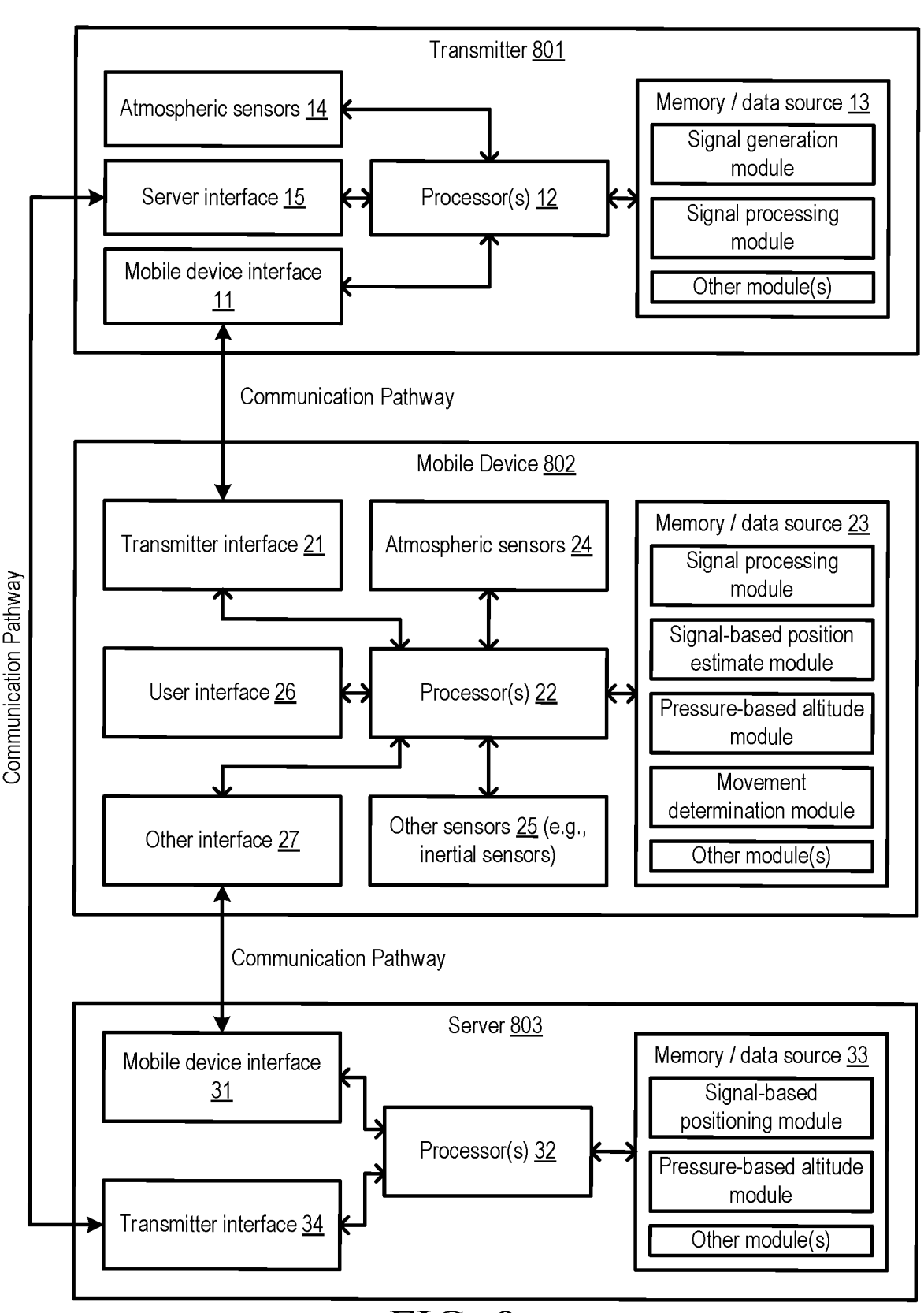
FIG. 9 illustrates components of a transmitter, an optional mobile device, and a server that can be used to perform the methods described herein.

FIG. 9 illustrates components of a transmitter 801, a mobile device 802, and a server 803 that can be used to perform the methods described herein. In some cases, mobile device 802 may be omitted from the object detection systems described herein. Examples of communication pathways are shown by arrows between components.

By way of example in FIG. 9, each of the transmitters 801 of the transceivers of the systems described herein (e.g., transceiver 110 of FIGS. 1A-5B) may include: a mobile device interface 11 for exchanging information with a mobile device (e.g., an antenna and RF front end components known in the art or otherwise disclosed herein); one or more processor(s) 12; memory/data source 13 for providing storage and retrieval of information and/or program instructions; atmospheric sensor(s) 14 for measuring environmental conditions (e.g., pressure, temperature, other) at or near the transmitter 801; a server interface 15 for exchanging information with a server (e.g., an antenna, a network interface, or other); and any other components known to one of ordinary skill in the art. The memory/data source 13 may include memory storing software modules with executable instructions, and the processor(s) 12 may perform different actions by executing the instructions from the modules, including: (i) performance of part or all of the methods as described herein or otherwise understood by one of skill in the art as being performable at the transmitter 801; (ii) generation of positioning signals for transmission using a selected time, frequency, code, and/or phase; (iii) processing of signaling received by the transmitter 801, for example, a reflected signal (from an object in the background or an OOI), a signal from the mobile device, or a signal from another source; or (iv) other processing as required by operations described in this disclosure. Signals generated and transmitted by a transmitter may carry different information that, once determined by a processor of a transceiver (e.g., 110 in FIGS. 1A-5B), a mobile device, or a server, may identify the following: the transmitter 801; the position of the transmitter 801; environmental conditions at or near the transmitter 801; and/or other information known in the art. The atmospheric sensor(s) 14 may be integral with the transmitter 801, or separate from the transmitter 801 and either co-located with the transmitter 801 or located in the vicinity of the transmitter 801 (e.g., within a threshold amount of distance).

By way of example FIG. 9, the optional mobile device 802 may include: a transmitter interface 21 for exchanging information with a transmitter (e.g., an antenna and RF front end components known in the art or otherwise disclosed herein); one or more processor(s) 22; memory/data source 23 for providing storage and retrieval of information and/or program instructions; atmospheric sensor(s) 24 for measuring environmental conditions (e.g., pressure, temperature, other) at the mobile device 802; other sensor(s) 25 for measuring other conditions (e.g., inertial sensors, such as an accelerometer, for measuring movement and orientation, gyroscopes, and GNSS sensors (i.e., GNSS antennas and related processing modules)); a user interface 26 (e.g., display, keyboard, microphone, speaker, other) for permitting a user to provide inputs and receive outputs; another interface 27 for exchanging information with the server or other devices external to the mobile device 802 (e.g., an antenna, a network interface, or other); and any other components known to one of ordinary skill in the art. A GNSS interface and processing unit (which is another sensor 25) are contemplated, which may be integrated with other components (e.g., the interface 21 and the processors 22) or a standalone antenna, RF front end, and processors dedicated to receiving and processing GNSS signaling. The memory/data source 23 may include memory storing software modules with executable instructions, and the processor(s) 22 may perform different actions by executing the instructions from the modules, including: (i) performance of part or all of the methods as described herein or otherwise understood by one of ordinary skill in the art as being performable at the mobile device 802; (ii) estimation of an altitude of the mobile device 802 based on measurements of pressure from the mobile device 802 and transmitter(s), temperature measurement(s) from the transmitter(s) or another source, and any other information needed for the computation); (iii) processing of received signals to determine position information (e.g., times of arrival or travel time of the signals, pseudo-ranges between the mobile device 802 and transmitters, transmitter atmospheric conditions, transmitter and/or locations or other transmitter information); (iv) use of position information to compute an estimated position of the mobile device 802; (v) determination of movement based on measurements from inertial sensors of the mobile device 802; (vi) GNSS signal processing; or (vii) other processing as required by operations described in this disclosure.

By way of example FIG. 9, the server 803 may include: a transmitter interface 34 for exchanging information with a transmitter (e.g., an antenna, a network interface, or other); one or more processor(s) 32; memory/data source 33 for providing storage and retrieval of information and/or program instructions; optionally a mobile device interface 31 for exchanging information with a mobile device (e.g., an antenna, a network interface, or other); and any other components known to one of ordinary skill in the art. The memory/data source 33 may include memory storing software modules with executable instructions, and the processor(s) 32 may perform different actions by executing instructions from the modules, including: (i) performance of part or all of the methods as described herein or otherwise understood by one of ordinary skill in the art as being performable at the server 803; (ii) estimation of locations of objects in an environment (e.g., in a background or an OOI); (iii) optionally, computation of an estimated position of the mobile device; or (iv) other processing as required by operations described in this disclosure. Steps performed by servers as described herein may also be performed on other machines that are remote from a mobile device, including computers of enterprises or any other suitable machine.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only and is not intended to limit the invention.

What is claimed is:

1. A method of detecting an object in an environment, comprising:
    transmitting a first set of transmitted signals from a set of transceivers, wherein each transceiver of the set of transceivers comprises a transmitter, an array of one or more antennas, and a processor;
    receiving a first set of received signals by the set of transceivers;
    processing the first set of received signals using the respective processors of the set of transceivers and a server coupled to the respective processors of the set of transceivers to determine a background for an environment;
    transmitting a second set of transmitted signals from the set of transceivers, wherein the second set of transmitted signals is transmitted at a later time than the first set of transmitted signals;
    receiving a first set of reflected signals by the set of transceivers, the first set of reflected signals comprising all or a portion of the second set of transmitted signals that were reflected off of an object of interest;
    processing the first set of reflected signals using the processors and the server to determine a first estimated location of the object of interest, wherein the processing the first set of reflected signals to determine the first estimated location of the object of interest further comprises detecting a change between the first set of received signals and the first set of reflected signals; and
    using the processors and the server to determine if the first estimated location of the object of interest is to be a reported location of the object of interest, and if the first estimated location of the object of interest is determined to be a reported location of the object of interest, then reporting the reported location of the object of interest to a system that utilizes the reported location of the object of interest.

2. The method of claim 1, wherein the processing the first set of reflected signals to determine the first estimated location of the object of interest further comprises calculating, for each transceiver of the set of transceivers, a direction from the array of antennas to the object of interest by receiving the first set of reflected signals using the array of antennas, and using the calculated directions from each of the arrays of antennas to the object of interest to determine a first proposed location of the object of interest, and
    wherein the first proposed location of the object of interest is determined to be the estimated location of the object of interest.

3. The method of claim 1, wherein the processing the first set of reflected signals to determine the first estimated location of the object of interest further comprises calculating, for each transceiver of the set of transceivers, a distance from the transceiver to the object of interest using a round-trip time difference between the transmitting the second set of transmitted signals and the receiving the first set of reflected signals, and using the calculated distances to determine a first proposed location of the object of interest, and
    wherein the first proposed location of the object of interest is determined to be the estimated location of the object of interest.

4. The method of claim 1, wherein the processing the first set of reflected signals using the processors and the server to determine the first estimated location of the object of interest further comprises:

determining a first proposed location of the object of interest using multiangulation by calculating, for each transceiver of the set of transceivers, a direction from the array of antennas to the object of interest by receiving the first set of reflected signals using the array of antennas;

determining a second proposed location of the object of interest using multilateration by calculating, for each transceiver of the set of transceivers, a distance from the transceiver to the object of interest using a round-trip time difference between the transmitting the second set of transmitted signals and the receiving the first set of reflected signals;

determining a difference between the first proposed location of the object of interest and the second proposed location of the object of interest; and using the difference to determine that the first proposed location or the second proposed location of the object of interest is the first estimated location of the object of interest, if the difference between the first proposed location of the object of interest and the second proposed location of the object of interest is less than a first threshold; or using the difference to determine that the first proposed location and the second proposed location of the object of interest are not the first estimated location of the object of interest, if the difference between the first proposed location of the object of interest and the second proposed location of the object of interest is greater than the first threshold.

5. The method of claim 4, wherein the first threshold is 10 meters.

6. The method of claim 1, further comprising:

transmitting a third set of transmitted signals from the set of transceivers, wherein the third set of transmitted signals is transmitted at a later time than the second set of transmitted signals;

receiving a second set of reflected signals by the set of transceivers, the second set of reflected signals comprising all or a portion of the third set of transmitted signals that were reflected off of the object of interest;

processing the second set of reflected signals using the respective processors of the set of transceivers and the server to determine a second estimated location of the object of interest;

determining a difference between the first estimated location of the object of interest and the second estimated location of the object of interest; and using the difference to determine that the first estimated location is the reported location of the object of interest, if the difference between the first estimated location of the object of interest and the second estimated location of the object of interest is less than a second threshold; or using the difference to determine that the first estimated location of the object of interest is not the reported location of the object of interest, if the difference between the first estimated location of the object of interest and the second estimated location of the object of interest is greater than the second threshold.

7. The method of claim 6, wherein the third set of transmitted signals is transmitted at a time less than 1 second after the second set of transmitted signals is transmitted, and wherein the second threshold is 2000 meters.

8. The method of claim 1, further comprising:

transmitting a third set of transmitted signals from a second set of transceivers, wherein the third set of transmitted signals is transmitted at a later time than the second set of transmitted signals, wherein each transceiver of the second set of transceivers comprises a transmitter, an array of one or more antennas, and a processor, and wherein the second set of transceivers comprises at least one transceiver that is not part of the first set of transceivers;

receiving a second set of reflected signals by the second set of transceivers, the second set of reflected signals comprising all or a portion of the third set of transmitted signals that were reflected off of the object of interest;

processing the second set of reflected signals using the respective processors of the second set of transceivers and the server to determine a second estimated location of the object of interest;

determining a difference between the first estimated location of the object of interest and the second estimated location of the object of interest; and using the difference to determine that the first estimated location of the object of interest is the reported location of the object of interest, if the difference between the first estimated location of the object of interest and the second estimated location of the object of interest is less than a first threshold; or using the difference to determine that the first estimated location of the object of interest is not the reported location of the object of interest, if the difference between the first estimated location of the object of interest and the second estimated location of the object of interest is greater than the first threshold.

9. The method of claim 8, wherein the first threshold is 10 meters.

10. The method of claim 1, wherein the first and second sets of transmitted signals comprise a frequency in the Location and Monitoring Service (LMS) frequency band.

11. The method of claim 1, wherein the first and second sets of transmitted signals comprise wireless communication signals comprising spread spectrums.

12. The method of claim 1, further comprising:

measuring a set of Doppler shifts between a first set of frequencies of the second set of transmitted signals and a second set of frequencies of the first set of reflected signals using the arrays of antennas of the set of transceivers; and processing the set of Doppler shifts using the processors and the server to determine a first velocity of the object of interest.

13. The method of claim 1, wherein a transceiver of the set of transceivers is coupled to an unmanned aircraft system (UAS).

14. The method of claim 1, wherein the processing the first set of reflected signals using the processors and the server to determine the first estimated location of the object of interest further comprises wirelessly communicating communication signals from the transmitters of the set of transceivers to the server, wherein the communication signals comprise information about the received first set of reflected signals from the processors of the set of transceivers.

15. The method of claim 1, wherein the environment is an outdoor environment, and wherein the object of interest is a person, an animal, a ground-based object, or a ground-based vehicle.

16. The method of claim 1, wherein the processing the first set of received signals to determine the background for the environment further comprises accounting for multipath propagation of the first set of transmitted signals reflecting off of one or more objects in the environment.

17. The method of claim 1, wherein the processing the first set of reflected signals to determine the first estimated location of the object of interest further comprises accounting for multipath propagation of the first set of reflected signals reflecting off of one or more objects in the environment in addition to reflecting off of the object of interest.

18. The method of claim 1, further comprising:

transmitting a third set of transmitted signals from the set of transceivers, wherein the third set of transmitted signals is transmitted at a later time than the second set of transmitted signals;

receiving a second set of reflected signals by the set of transceivers, the second set of reflected signals comprising all or a portion of the third set of transmitted signals that were reflected off of the background, but substantially no signals reflecting off of the object of interest; and processing the second set of reflected signals using the respective processors of the set of transceivers and the server to determine that the object of interest is not in the environment at the later time.

19. A method of detecting an object in an environment, comprising:

transmitting a first set of transmitted signals from a first set of transceivers, wherein each transceiver of the first set of transceivers comprises a transmitter, an array of one or more antennas, and a processor;

receiving a first set of received signals by the first set of transceivers;

processing the first set of received signals using the respective processors of the first set of transceivers and a server coupled to the respective processors of the first set of transceivers to determine a background for an environment;

transmitting a second set of transmitted signals from the first set of transceivers, wherein the second set of transmitted signals is transmitted at a later time than the first set of transmitted signals;

receiving a first set of reflected signals by the first set of transceivers, the first set of reflected signals comprising all or a portion of the second set of transmitted signals that were reflected off of an object of interest;

processing the first set of reflected signals using the processors and the server to determine a first estimated location of the object of interest, wherein the processing the first set of reflected signals to determine the first estimated location of the object of interest further comprises detecting a change between the first set of received signals and the first set of reflected signals;

transmitting a third set of transmitted signals from a second set of transceivers, wherein the third set of transmitted signals is transmitted at a later time than the second set of transmitted signals, wherein each transceiver of the second set of transceivers comprises a transmitter, an array of one or more antennas, and a processor, and wherein the second set of transceivers comprises at least one transceiver that is not part of the first set of transceivers;

receiving a second set of reflected signals by the second set of transceivers, the second set of reflected signals comprising all or a portion of the third set of transmitted signals that were reflected off of the object of interest;

processing the second set of reflected signals using the respective processors of the second set of transceivers and the server to determine a second estimated location of the object of interest;

determining a difference between the first estimated location of the object of interest and the second estimated location of the object of interest; and using the difference to determine that the first estimated location of the object of interest is a reported location of the object of interest, if the difference between the first estimated location of the object of interest and the second estimated location of the object of interest is less than a first threshold, and reporting the reported location of the object of interest to a system that utilizes the reported location of the object of interest; or using the difference to determine that the first estimated location of the object of interest is not a reported location of the object of interest, if the difference between the first estimated location of the object of interest and the second estimated location of the object of interest is greater than the first threshold.

20. The method of claim 19, wherein:

the processing the first set of reflected signals to determine the first estimated location of the object of interest further comprises using multiangulation by calculating, for each transceiver of the set of transceivers, a direction from the array of antennas to the object of interest by receiving the first set of reflected signals using the array of antennas;

the processing the second set of reflected signals to determine the second estimated location of the object of interest further comprises using multilateration by calculating, for each transceiver of the set of transceivers, a distance from the transceiver to the object of interest using a round-trip time difference between the transmitting the second set of transmitted signals and the receiving the first set of reflected signals.

\* \* \* \* \*